(12) United States Patent
McClellan et al.

(10) Patent No.: US 8,191,321 B2
(45) Date of Patent: Jun. 5, 2012

(54) BUILDING INTEGRATED SOLAR ARRAY SUPPORT STRUCTURE DEVICE, SYSTEM, AND METHOD

(76) Inventors: Vncent Jack McClellan, Eugene, OR (US); Eric Roy Morrison, Eugene, OR (US); Ry Reuter Heller, Eugene, OR (US)

( * ) Notice: Subject to any disclaimer, the term of this patent is extended or adjusted under 35 U.S.C. 154(b) by 0 days.

(21) Appl. No.: 12/813,134

(22) Filed: Jun. 10, 2010

(65) Prior Publication Data
US 2011/0302857 A1 Dec. 15, 2011

(51) Int. Cl.
*E04H 14/00* (2006.01)
*E04D 13/18* (2006.01)

(52) U.S. Cl. ........................ 52/173.3; 126/623
(58) Field of Classification Search ............... 52/11, 13, 52/173.3, 302.1; 136/244; 126/623; 248/229.11–229.12, 229.2, 298.1
See application file for complete search history.

(56) References Cited

U.S. PATENT DOCUMENTS

| | | |
|---|---|---|
| 5,143,556 A | 9/1992 | Matlin |
| 6,242,685 B1 | 6/2001 | Mizukami |
| 6,414,237 B1 | 7/2002 | Boer |
| 6,465,724 B1 | 10/2002 | Garvison et al. |
| 6,959,517 B2 | 11/2005 | Poddany et al. |
| 7,102,074 B2 | 9/2006 | Yen et al. |
| 7,297,866 B2 | 11/2007 | Aschenbrenner |
| 7,406,800 B2 | 8/2008 | Cinnamon et al. |
| D627,717 S * | 11/2010 | Munoz et al. ............... D13/102 |
| 2003/0015637 A1* | 1/2003 | Liebendorfer ............... 248/237 |
| 2010/0313506 A1* | 12/2010 | Schoell ....................... 52/302.1 |
| 2011/0138585 A1* | 6/2011 | Kmita et al. .................. 24/522 |

* cited by examiner

*Primary Examiner* — Brian Glessner
*Assistant Examiner* — Paola Agudelo
(74) *Attorney, Agent, or Firm* — Peter A. Haas, Esquire LLC

(57) ABSTRACT

The system provides an n-s rail bracket that both supports a plurality of solar panels structurally, provides view-guards to hide electrical components, and a water conduit to channel water shed from the solar panel to a desired collection point provided by the structure. As such, the system includes an n-s structural rail consisting of a bottom wall and two vertically extending sidewalls. An intermediate horizontal member extends between the two sidewalls at or near their midpoint to form a compartment between the intermediate horizontal member, a lower portion of the left sidewall, the bottom wall, and a lower portion of the right side wall. Also, the intermediate horizontal member cooperates with an upper portion of the left side wall and an upper portion of the right sidewall to form a U-shaped channel. Each distal end of the respective left and right side wall includes a T-shaped shoulder for supporting the solar module.

13 Claims, 28 Drawing Sheets

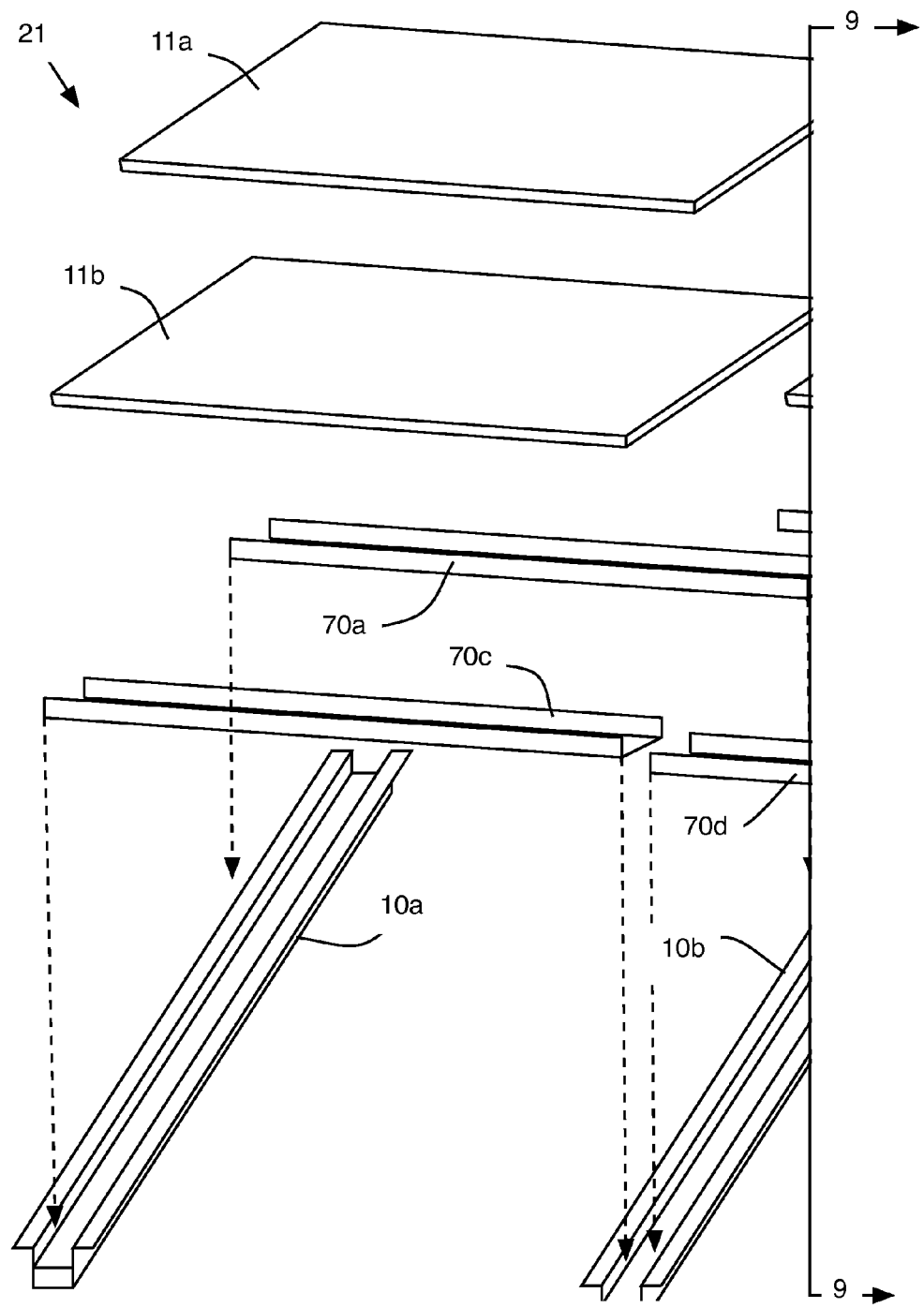
FIGURE #8

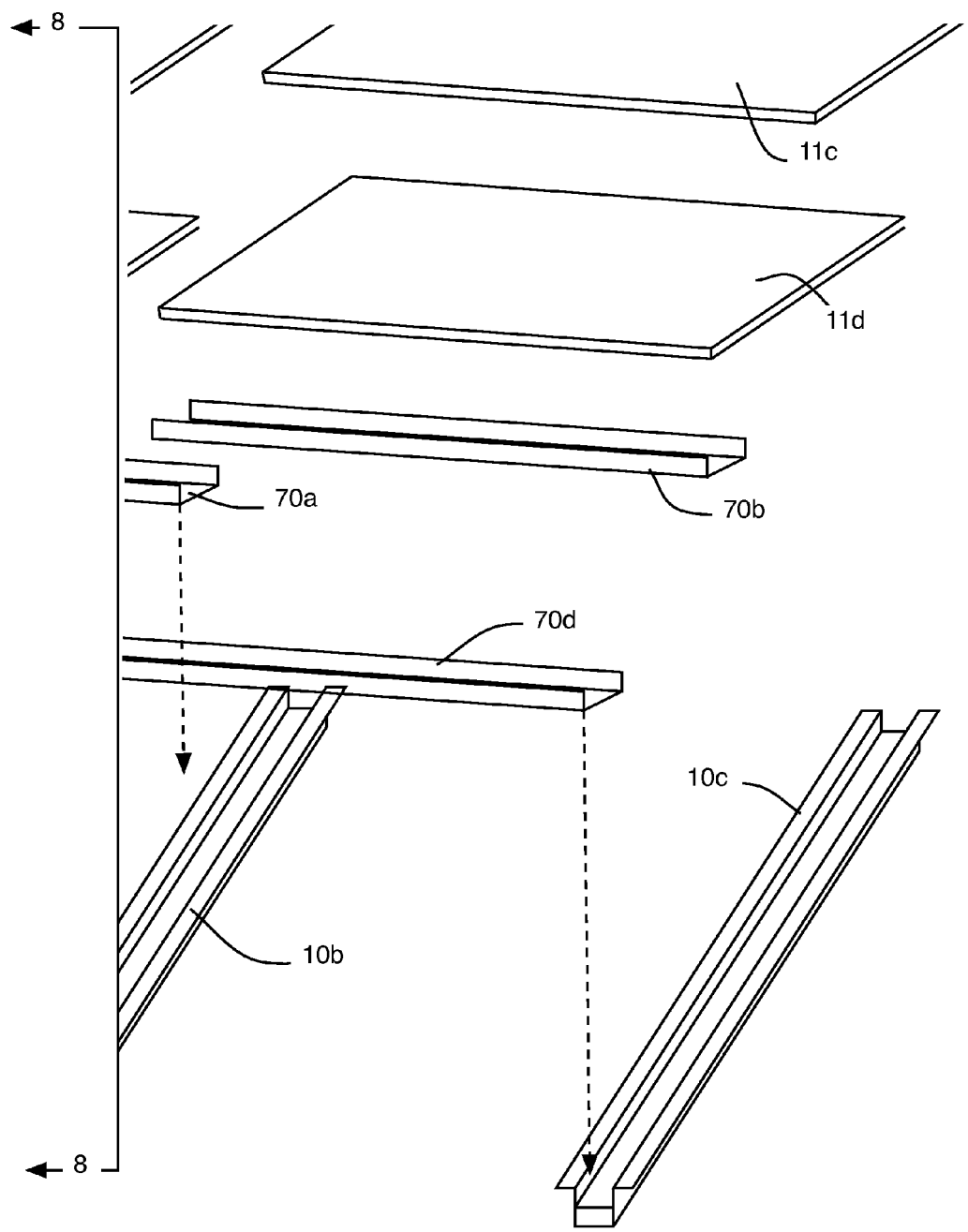
FIGURE #9

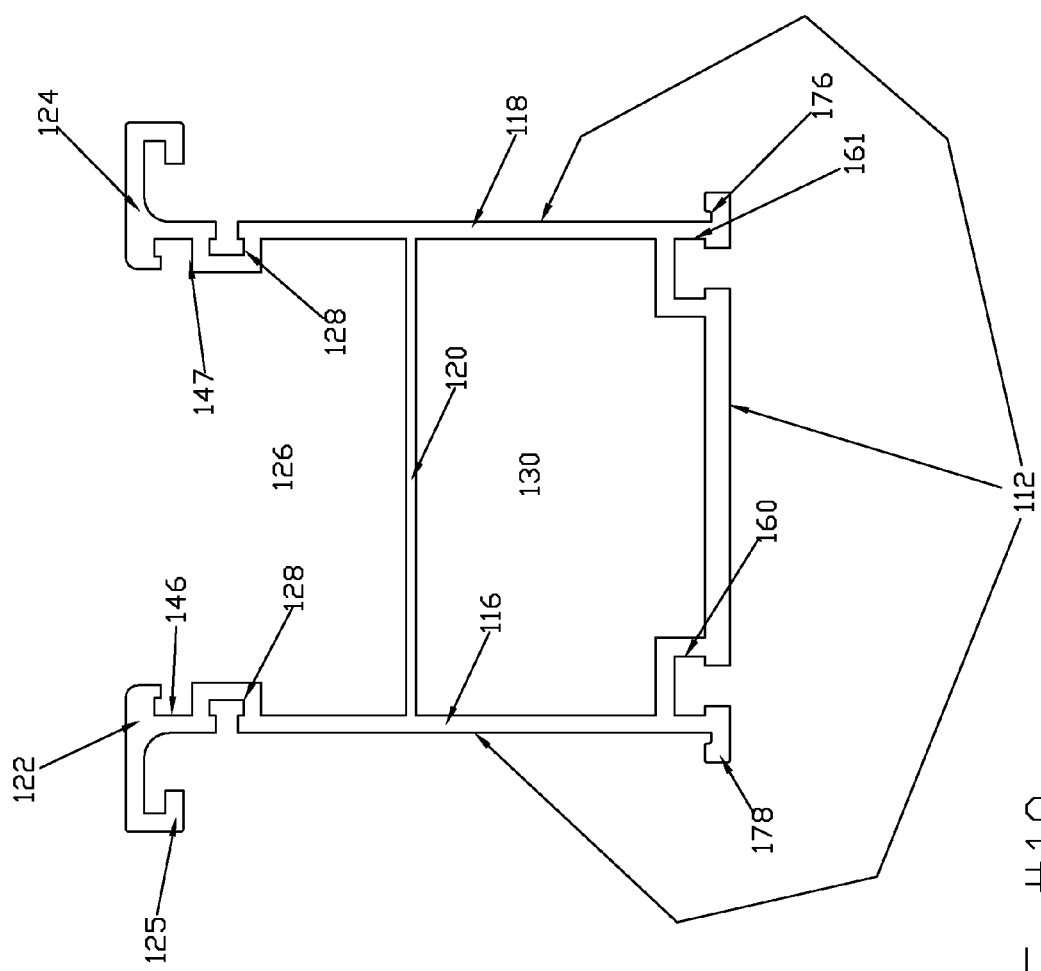
FIGURE #10

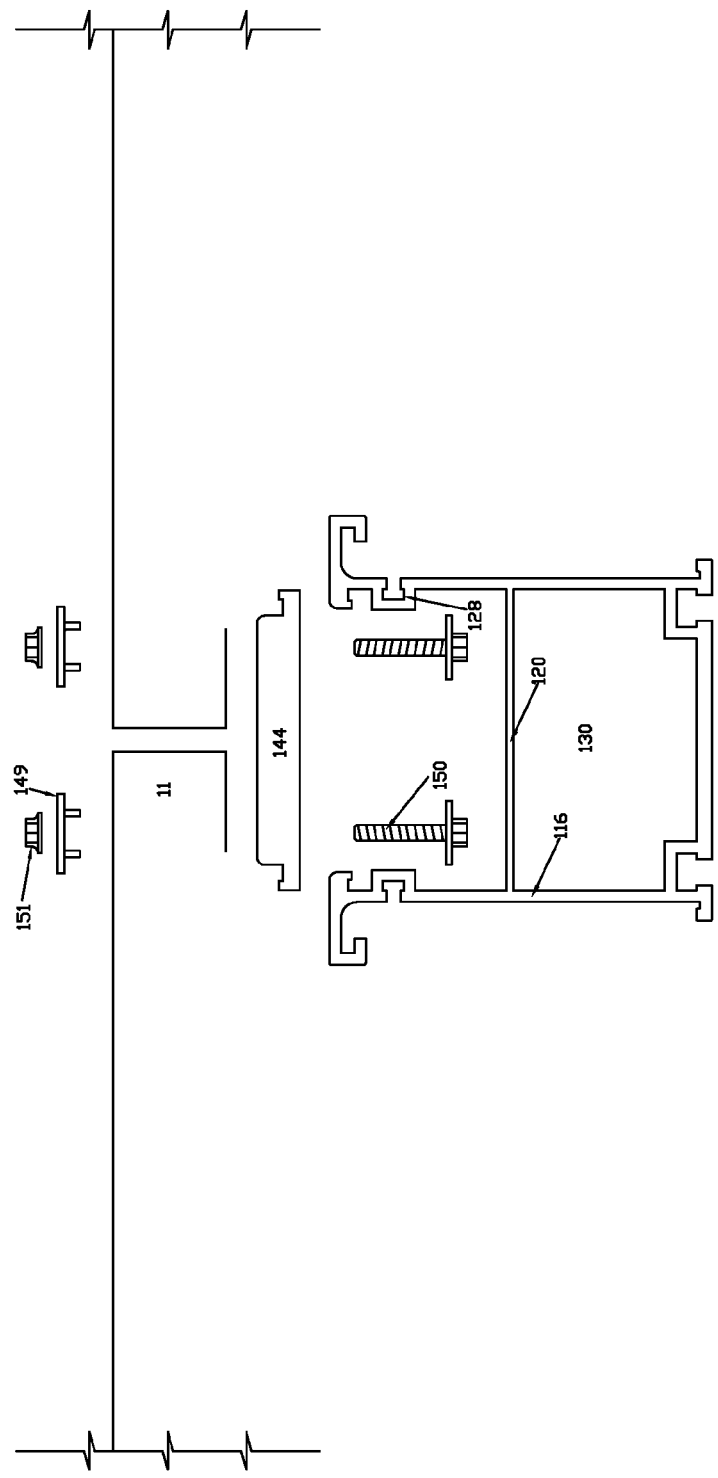
FIGURE #11

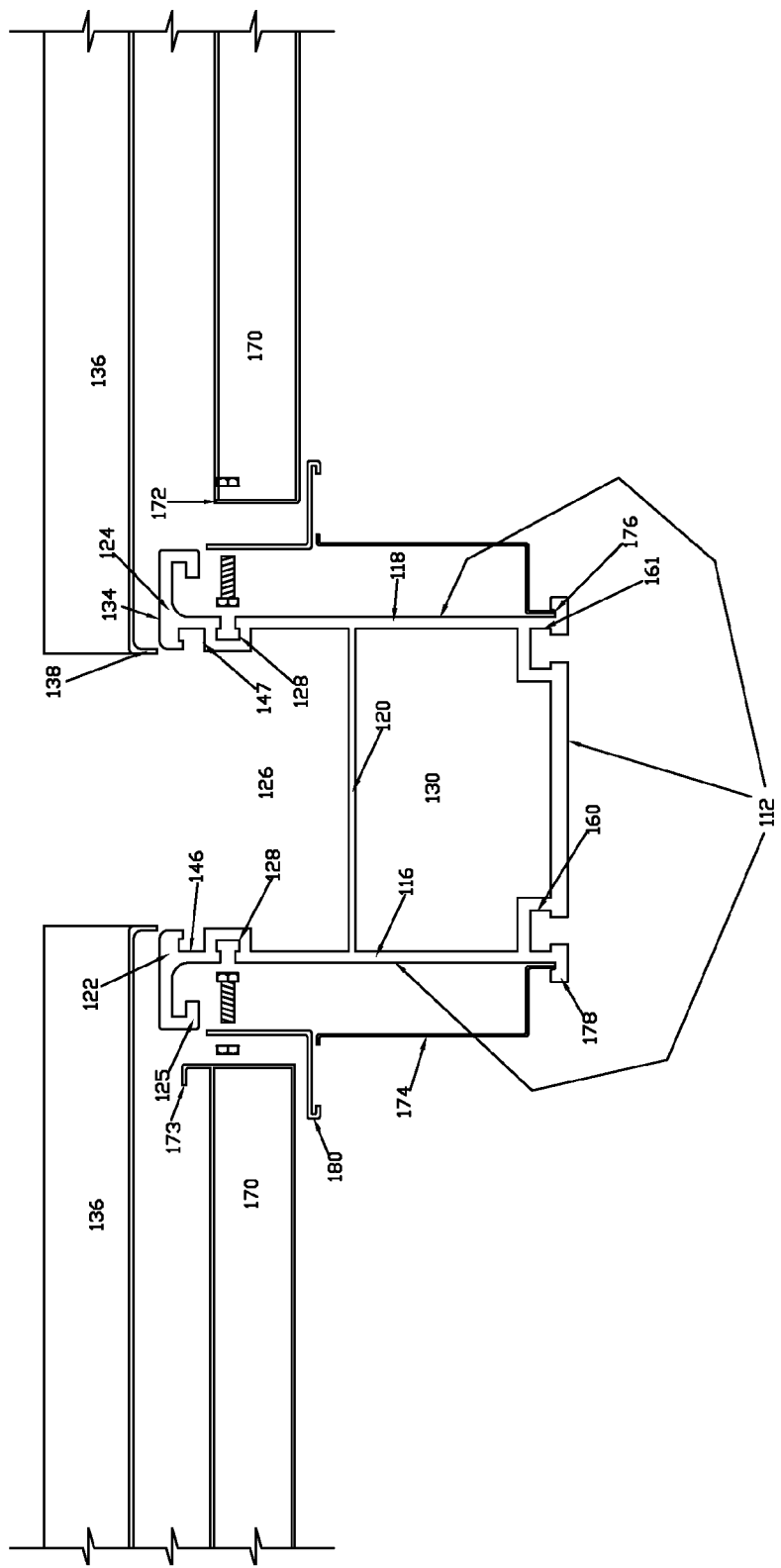
FIGURE #12

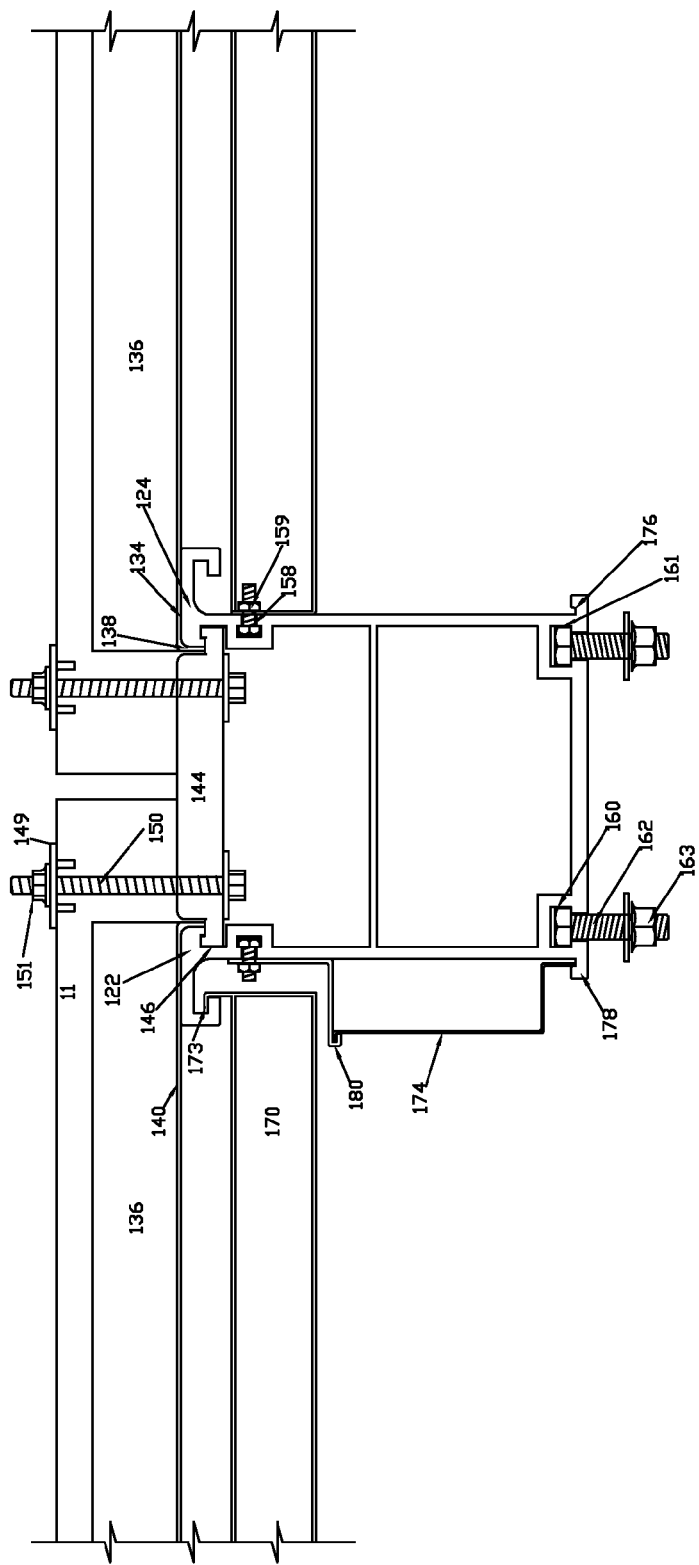
FIGURE #13

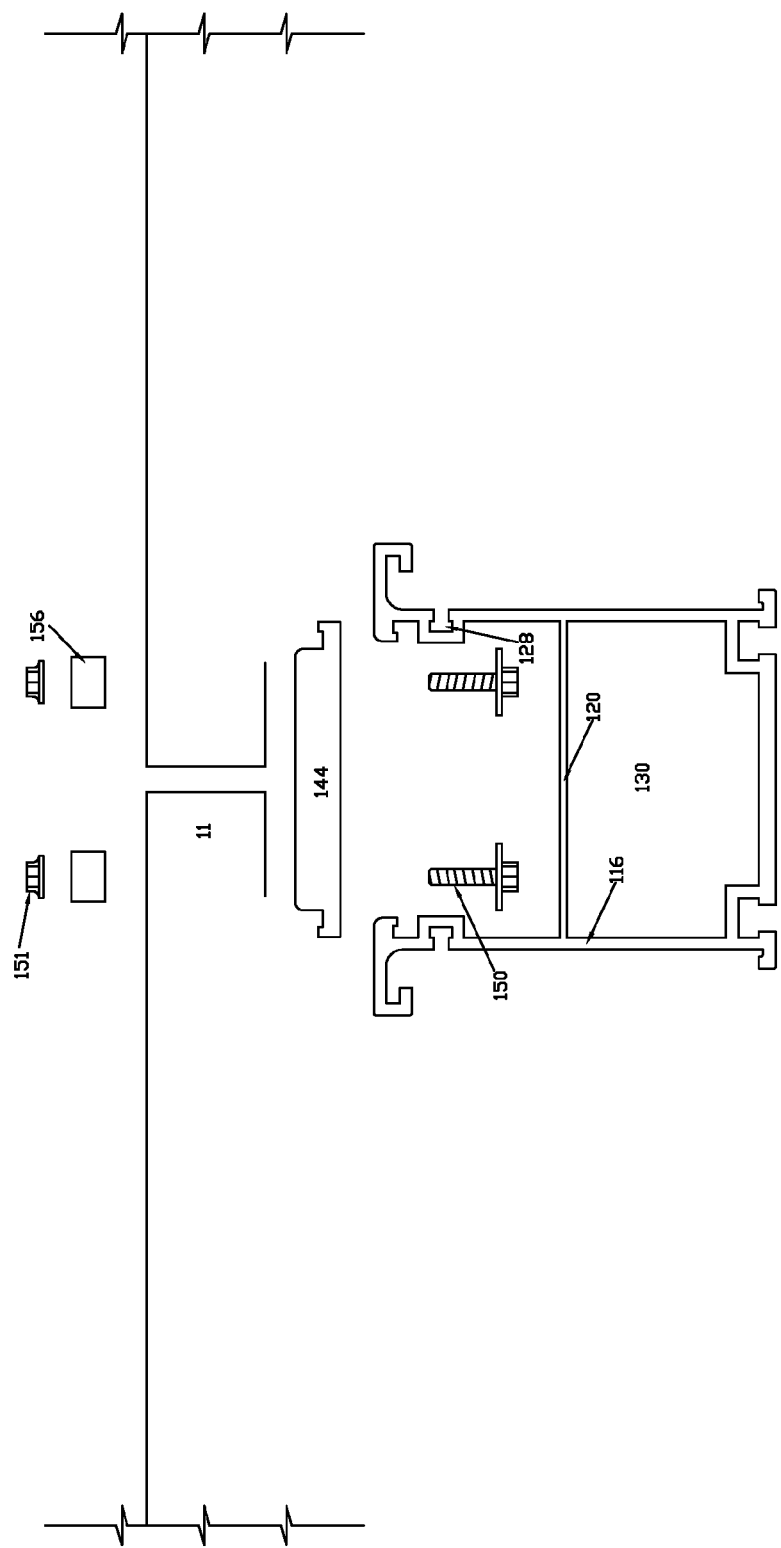
FIGURE #14

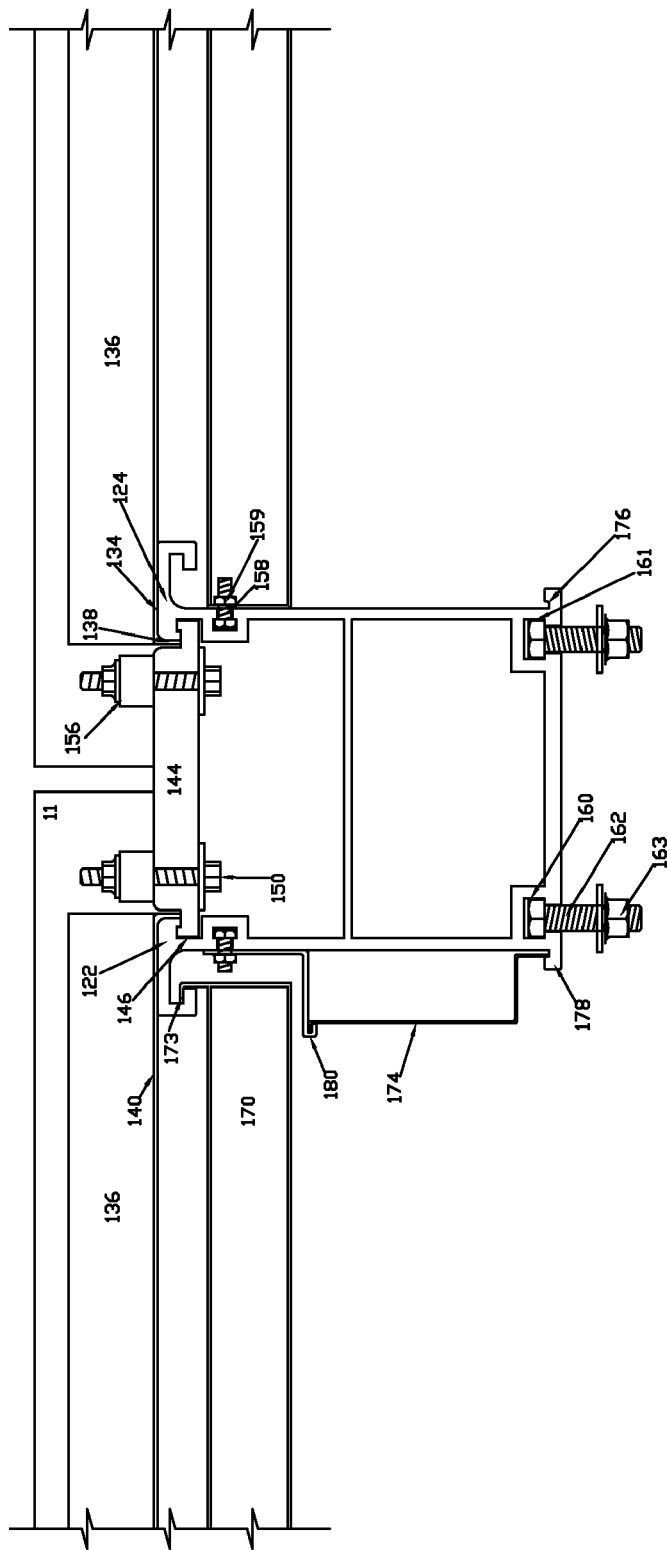
FIGURE #15

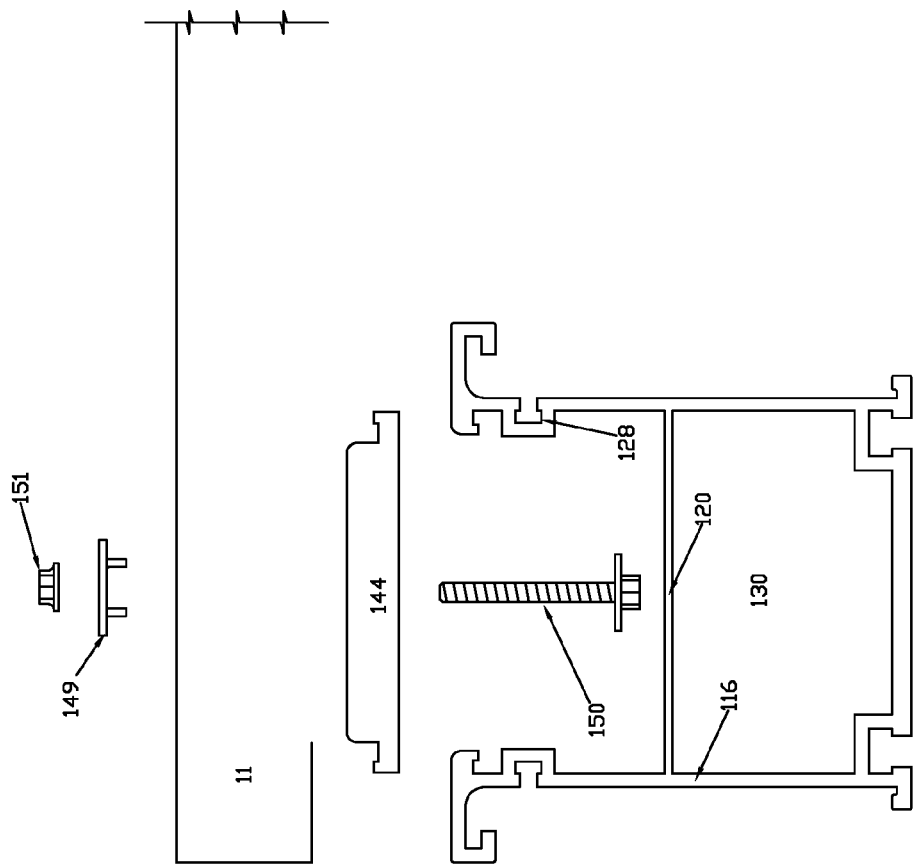

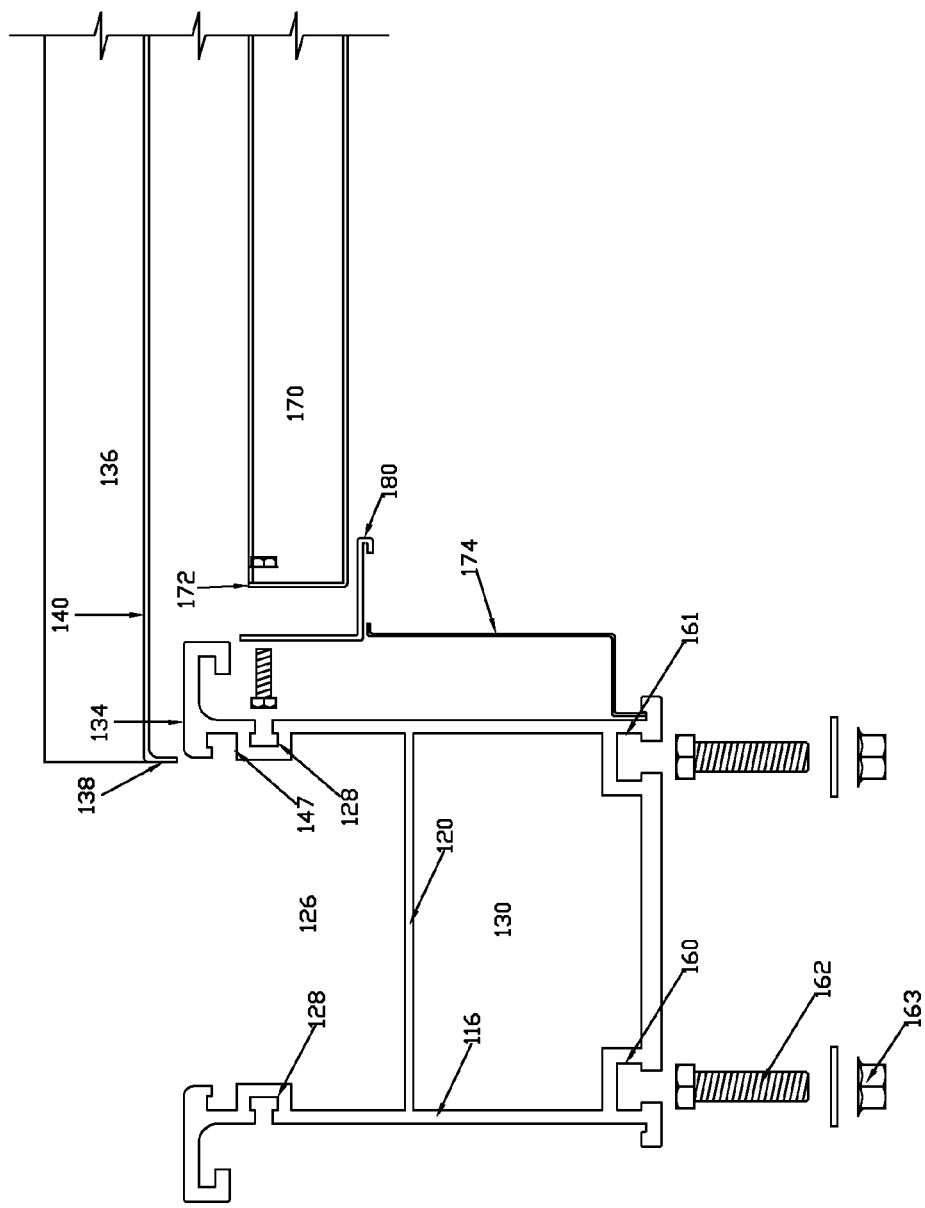
FIGURE #17

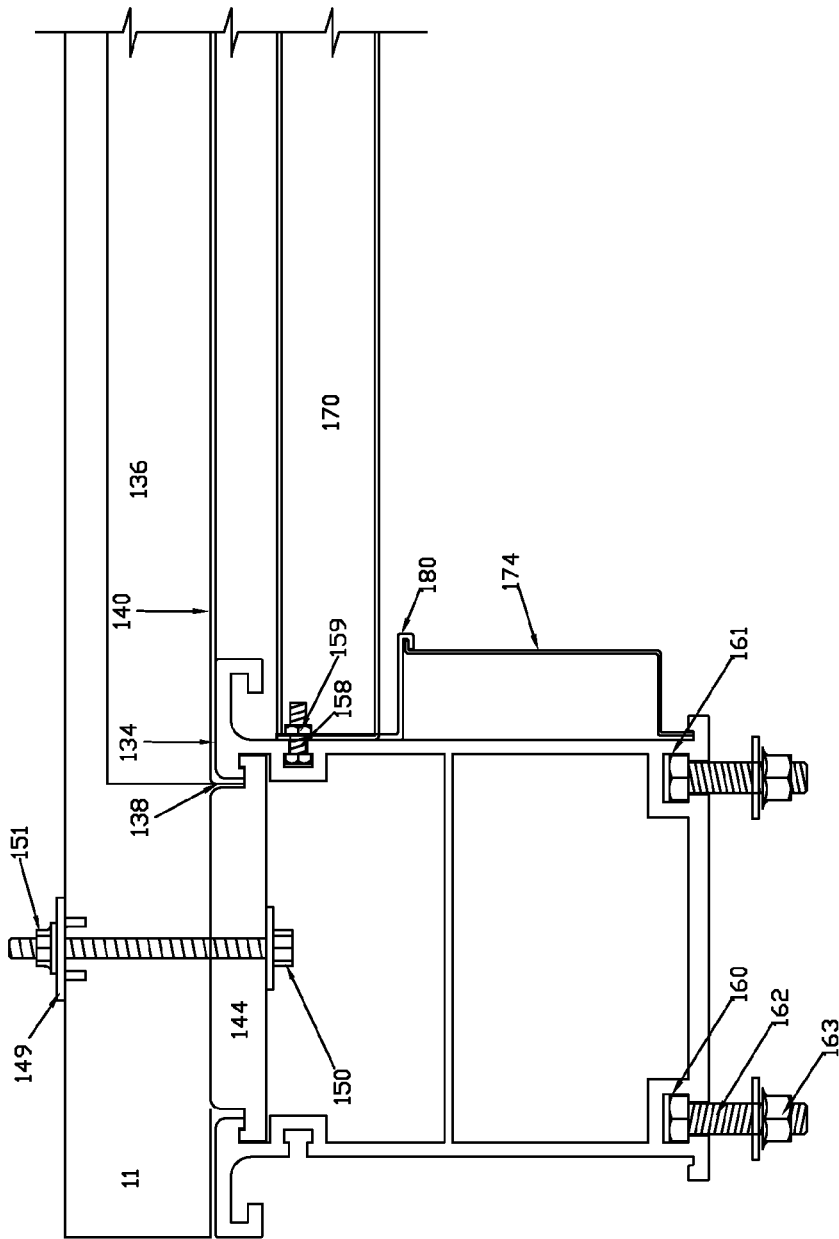
FIGURE #18

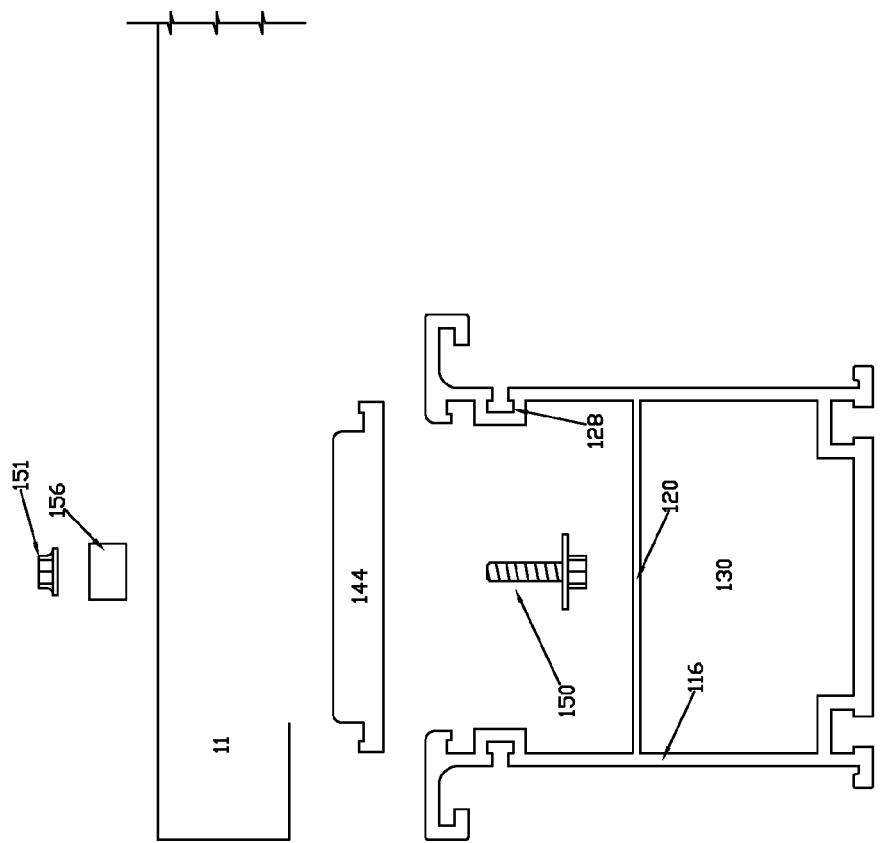
FIGURE #19

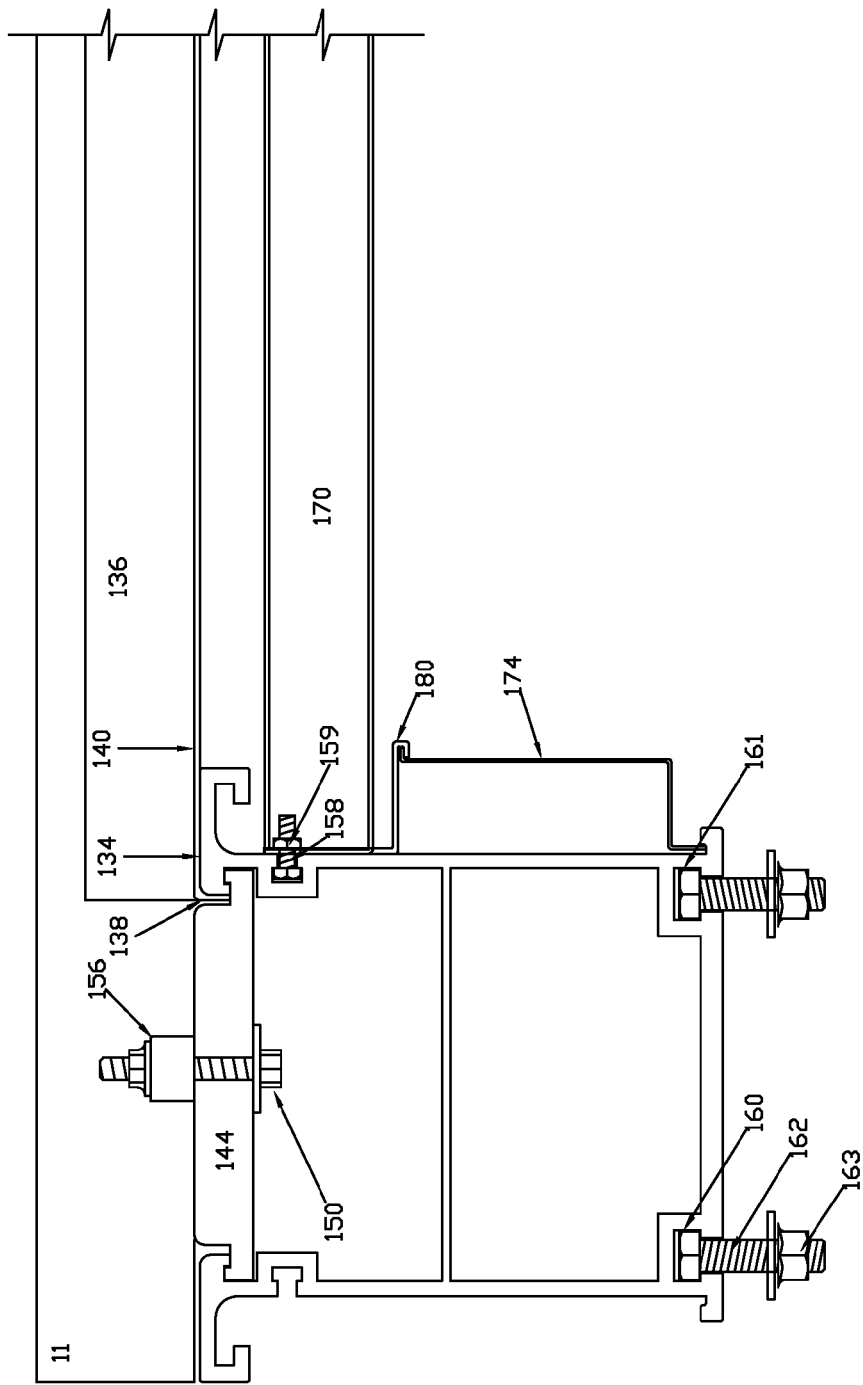
FIGURE #20

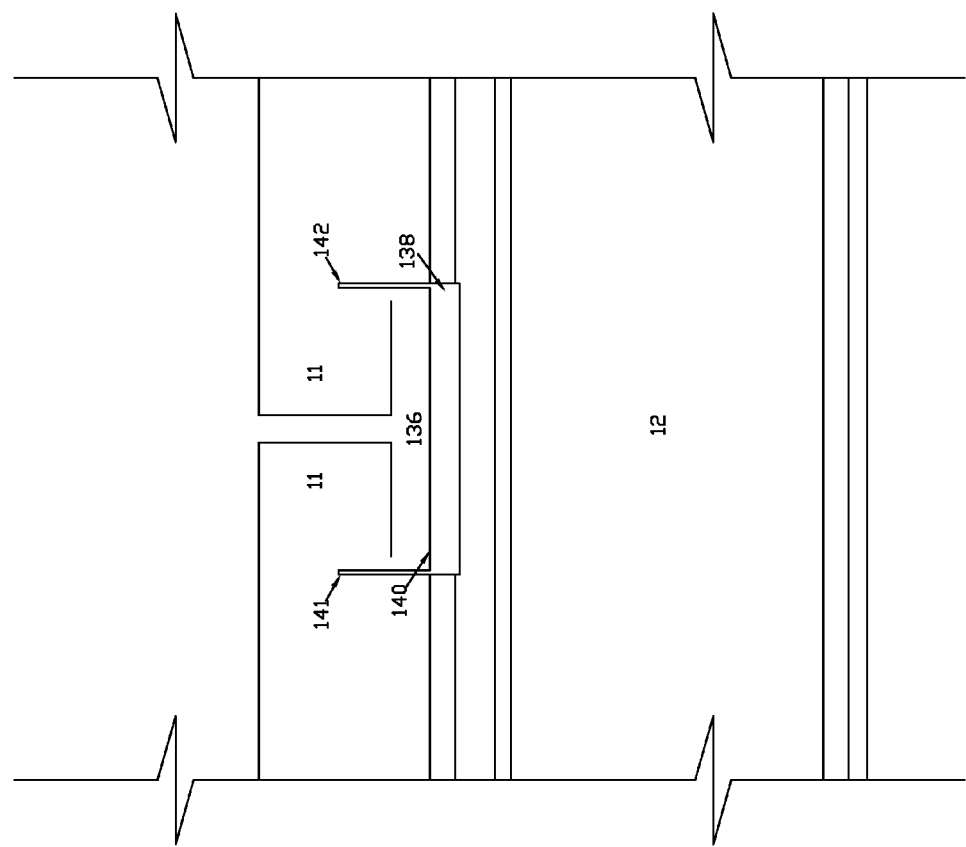

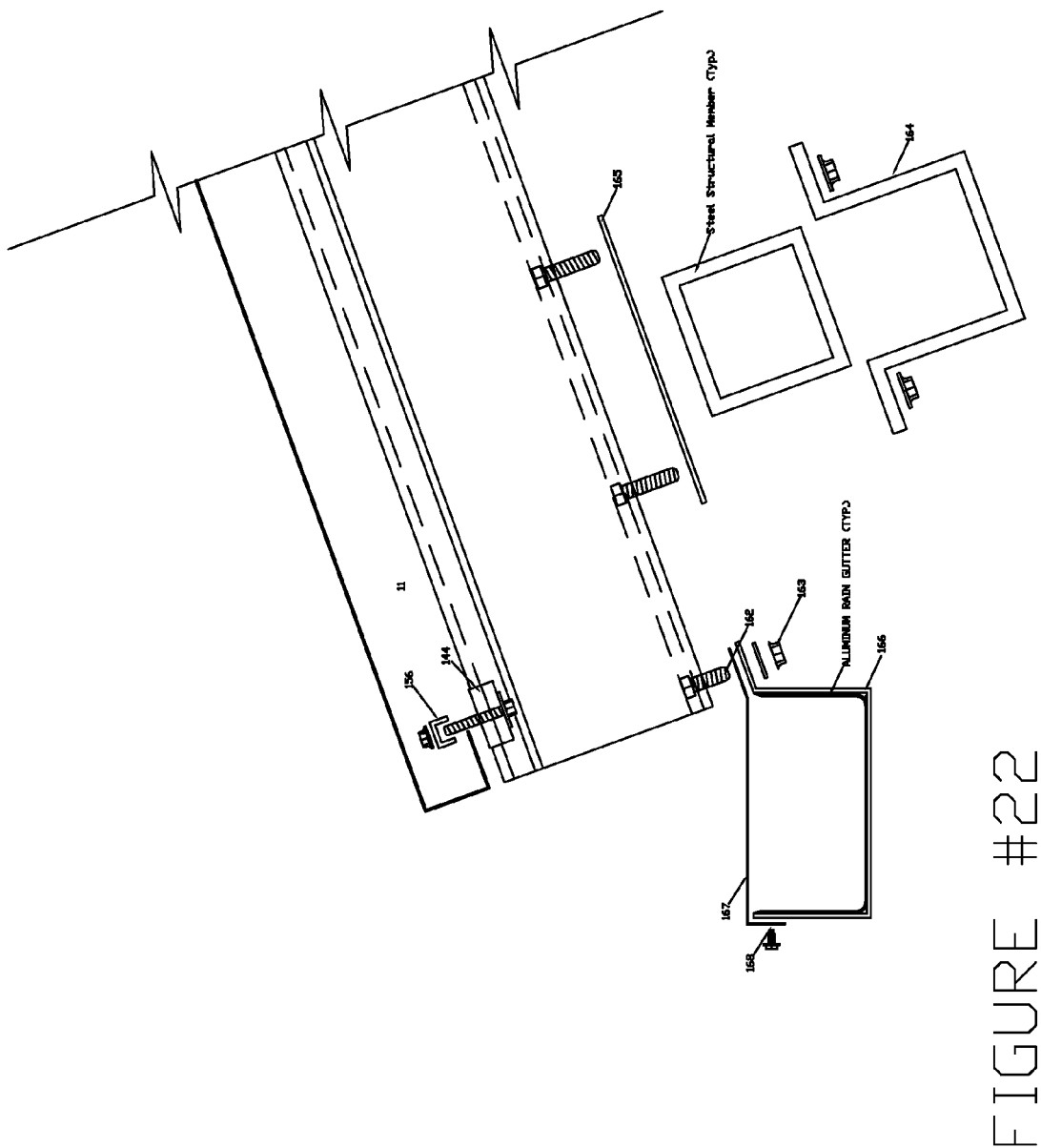
FIGURE #22

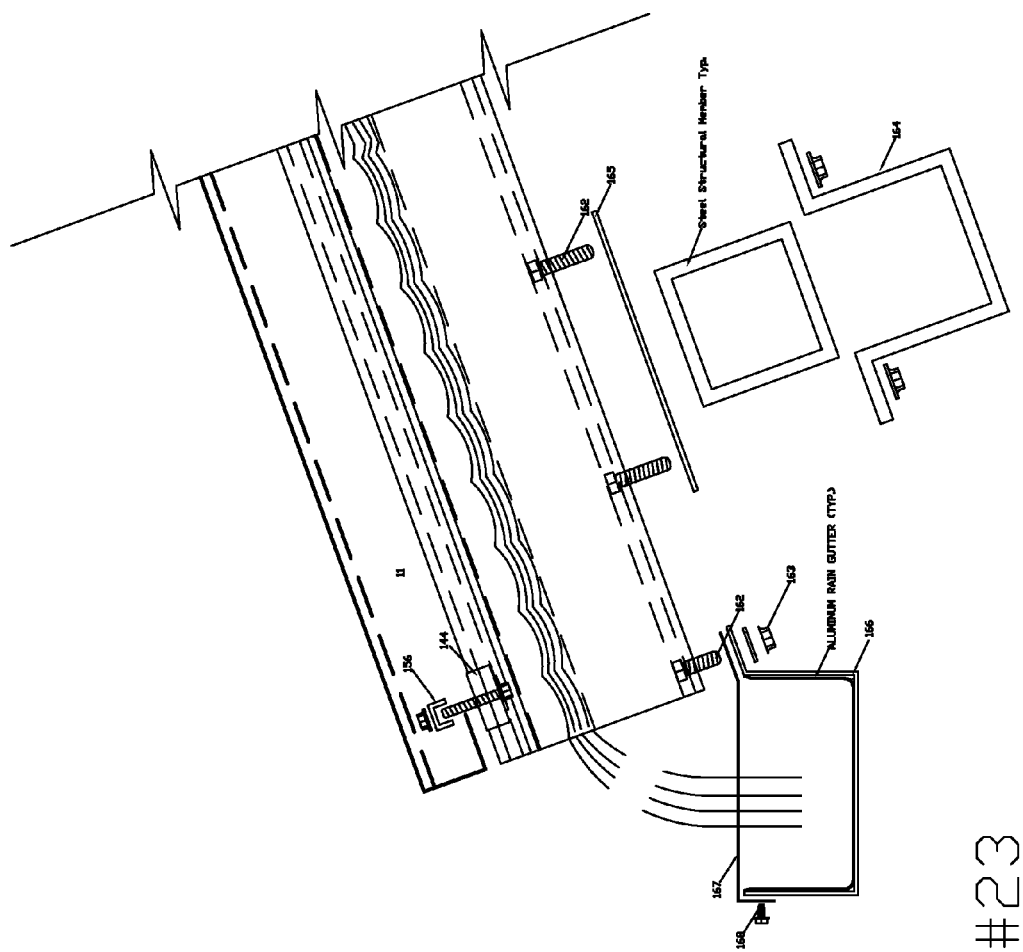
FIGURE #23

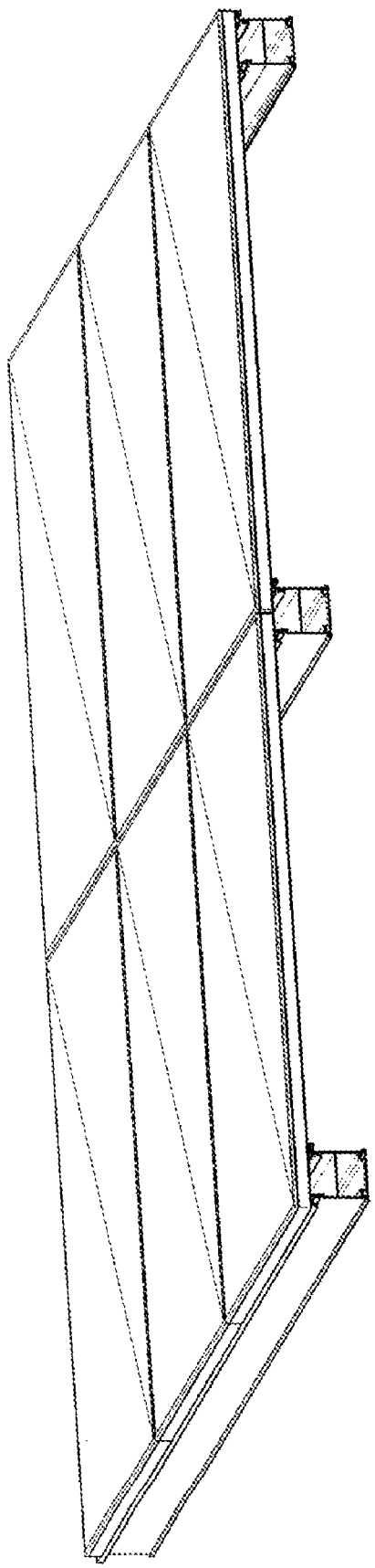
FIGURE #24

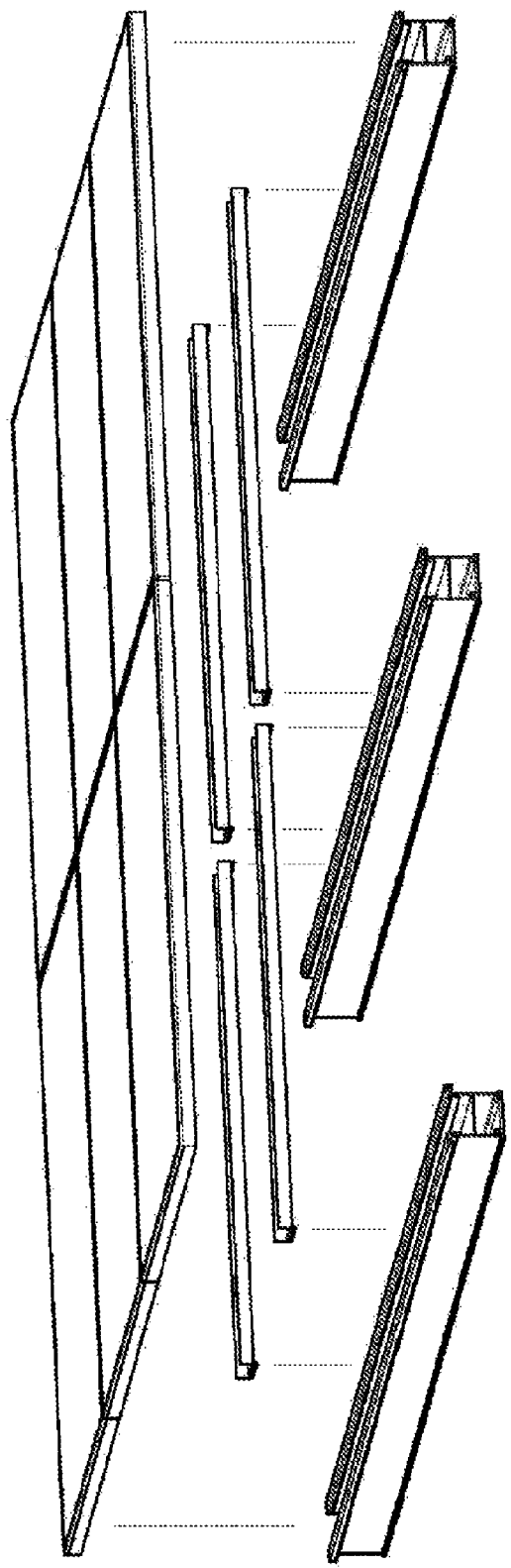
FIGURE #25

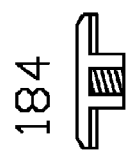
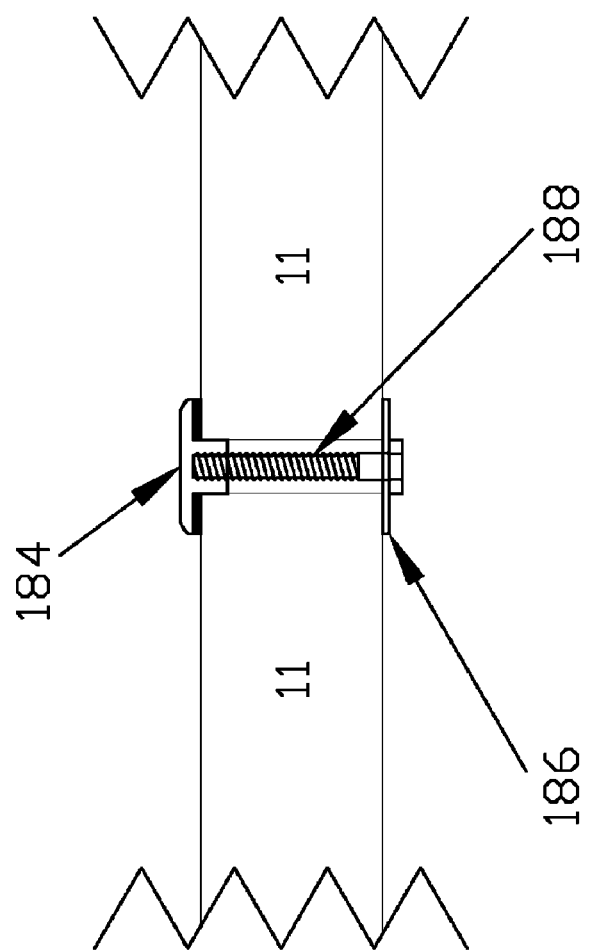

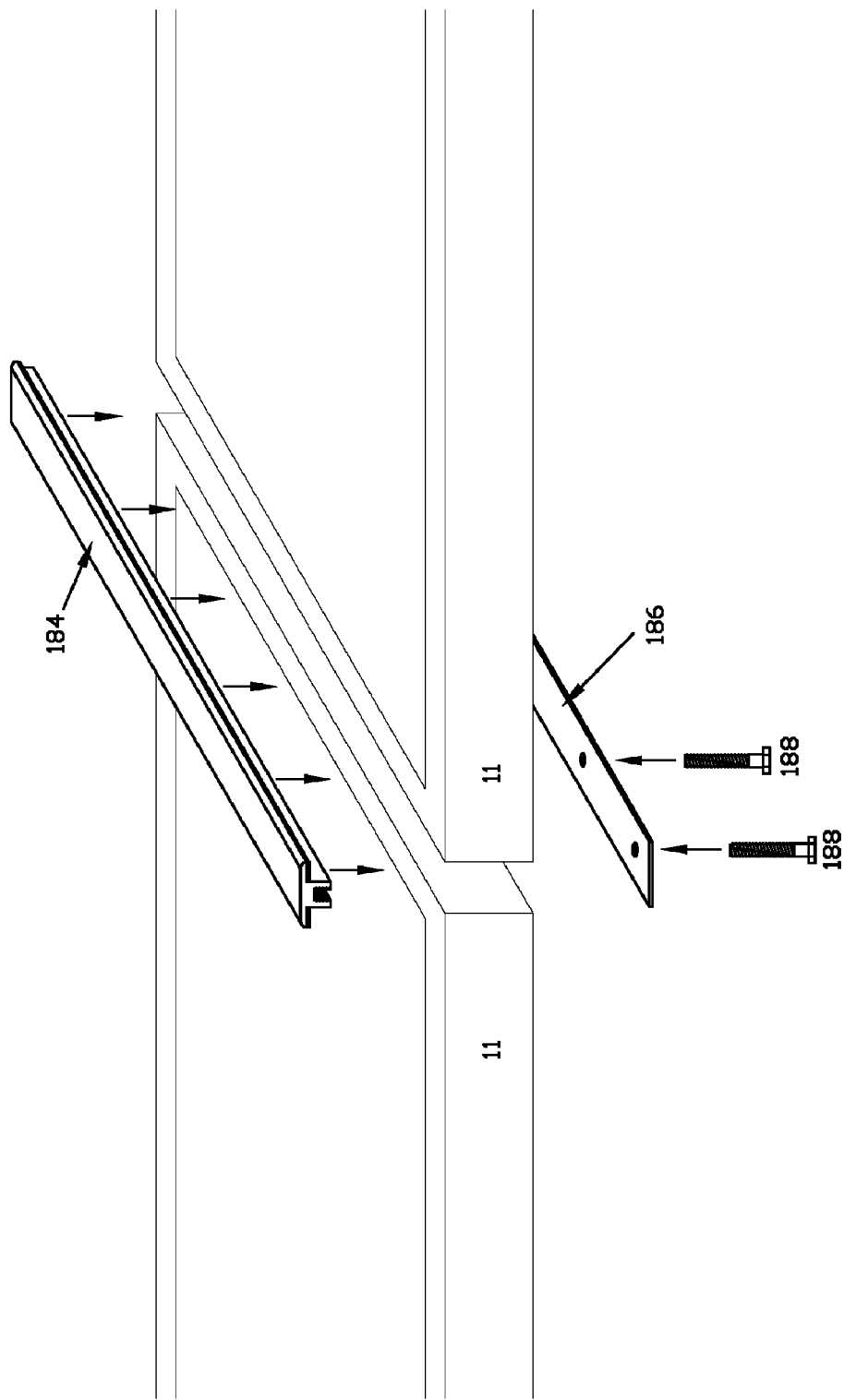

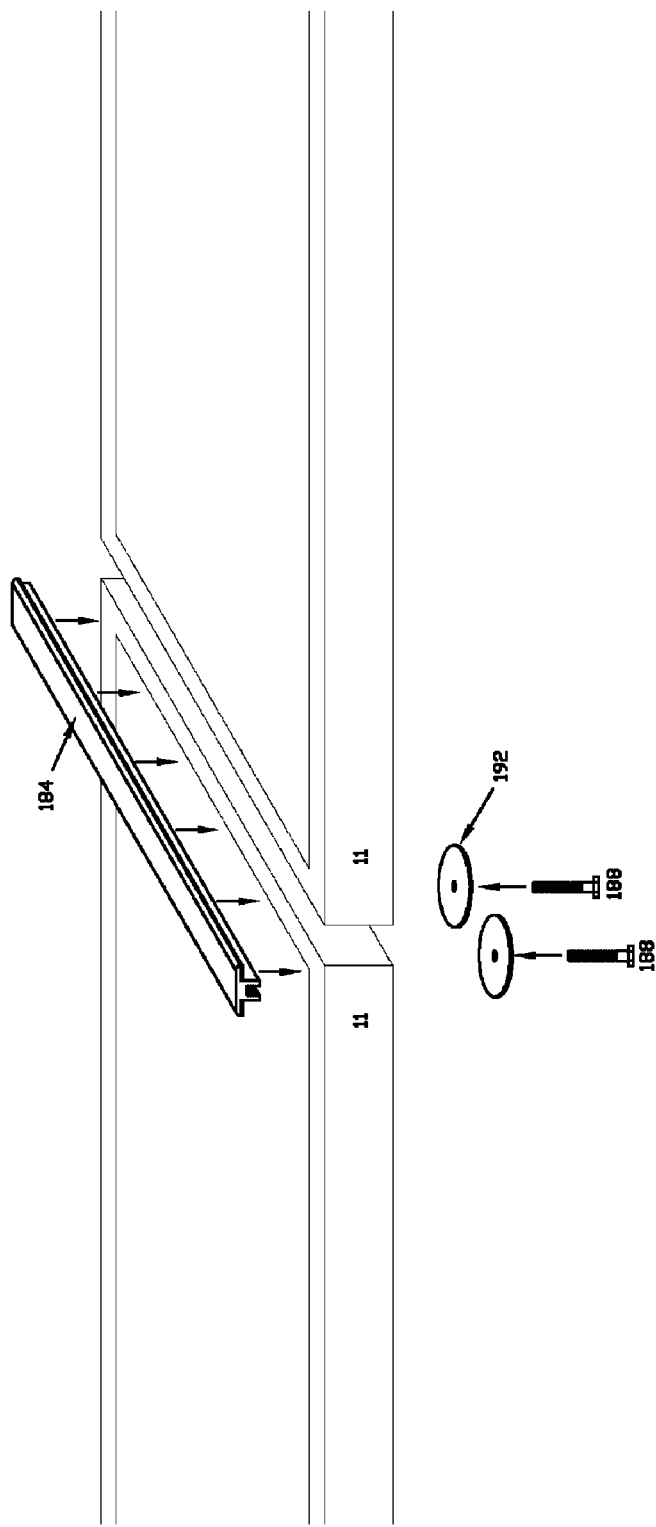

BUILDING INTEGRATED SOLAR ARRAY SUPPORT STRUCTURE DEVICE, SYSTEM, AND METHOD

BACKGROUND

This invention relates to a device and system directed to a mounting structure for solar collectors and more specifically to a system that both mounts solar collectors to a structure and directs water off the solar collectors and structure.

Photovoltaic modules (solar collectors), typically arranged as an array of rows and columns of individual solar modules, receive light to generate electricity. Modern solar arrays increase efficiency significantly when arranged to receive both direct sunlight (top surface) and ambient reflected light (top and bottom surfaces). Therefore, there is a recent effort to improve the mounting systems to suspend an array in such a way as to maximize the surface area of both the top and bottom sides of each solar module.

Further, as the arrays are necessarily exposed to the elements, they are subject to all weather conditions imaginable. Precipitation is a leading cause of deterioration of the physical and electrical properties of solar arrays. Moisture from rain or melting snow, for example, can lead to delaminating or electrical failure of the individual solar modules and significantly reduce the efficiency of the array.

Thus, it is highly desirable to provide a mounting system for solar modules that maximizes the surface area of the module to both direct and indirect light sources, while simultaneously providing a stable structure, provide conduits for electrical components, and provide improved means for ridding moisture from the array.

More importantly, as solar modules are increasingly more efficient at converting lower levels of ambient, direct, and indirect light into cost-effective electricity, solar arrays are increasingly being installed in more-precipitation-prone environments such as the Pacific Northwest region of the United States. In this rainy environment solar arrays not only provide cost-effective electricity, but also are erected over areas so that human activity can occur below. For example, a solar array may be arranged over a fueling depot with sufficient clearance to permit vehicles to park underneath while re-fueling. It will be appreciated that providing an overhead structure that directs precipitation away from the solar panel and prevents unwanted rainwater from spilling onto the area directly beneath the solar array would be very desirable. However, the current state of the art of mounting systems and structures and methods has yet to provide an effective, cost-efficient solution that provides a stable structure, pathways for electrical components, acceptable means for ridding moisture from the array, and diverting that moisture to desired locations.

One representative panel-mounting bracket, described in U.S. Pat. No. 6,959,517 issued on 1 Nov. 2005 to Poddany et al., discloses a frame bracket for mounting a photovoltaic module that supports the module without directly contacting the frame and insodoing prevents moisture from becoming trapped between the edge of the module and the frame. Specifically, the Poddany apparatus includes a mounting bracket having a bottom flange, an upright portion, a top flange, a first extension, and a second extension. The upright portion extends from the bottom flange. The bottom flange can include a member sized to accommodate a hardware connector. The upright portion has an inner surface and an outer surface. The top flange is opposite the bottom flange and extends from the upright portion. The top flange has a downward facing inner surface configured to adjoin an upper surface of a photovoltaic module. The first extension extends from the inner surface of the upright portion at a position between the top flange and the bottom flange. The first extension has a first surface that defines a first groove sized to accommodate an edge of the photovoltaic module with the downward facing inner surface of the top flange. The first extension has a second surface opposed to the first surface. The second extension is adjacent to the first extension and extends from the inner surface of the upright portion at a position between the first extension and the bottom flange. The second extension has a surface that defines a second groove with the second surface of the first extension. The Poddany apparatus does contemplate draining water from the photovoltaic panel and discloses structure to allow air to circulate around the photovoltaic panel. But, Poddany, does not contemplate, disclose, instruct, or imply any structure suited to direct the water once it is off the photovoltaic panel, or to intentionally channel water once it reaches the frame bracket, nor to direct water within the frame bracket, and further provides no structure or teaching to direct water from each individual panel when linked together to form an array of panels including no instruction on how to move water in both in a lateral and longitudinal direction to a desired position. Further, the Poddany apparatus, also, does not instruct, contemplate, or disclose any structural elements or methods to provide a continuous, moisture-proof system of panels and brackets that would be well-suited to act as a roof structure that would keep the area below the system dry.

Other known solar panel mounting systems share the shortcomings of the Poddany apparatus. These shortcomings may be summarized as lacking the requisite structural features that direct water that sheds from the panel into a system of sealed channels that run both north-south and east-west so that the entire array serves as a water shedding roof free of leaks, yet also present the maximum amount of panel surface area exposed to various light sources, while providing adequate support of the panels. Such known systems with these common shortcomings include the disclosures of Boer in U.S. Pat. No. 6,414,237 issued on 2 Jul. 2002, Mizukami et al. in U.S. Pat. No. 6,242,685 issued on 5 Jun. 2002, and Aschenbrenner in U.S. Pat. No. 7,297,866 issued on 20 Nov. 2007, for example.

Other known solar panel mounting systems not only fail to provide structure suitable for intentionally diverting rain water, but provide less-than-ideal amount of panel surface on both the top and bottom sides of the modules in the array. These systems rely on the integrity of the structure to provide a weatherproof, water-shedding roof (i.e. the building roof is used to support the frame supporting the solar array). Samples of such systems include the photovoltaic attachment system of Yen et al. disclosed in U.S. Pat. No. 7,122,074 issued on 5 Sep. 2006, and the support for photovoltaic arrays described by Matlin in U.S. Pat. No. 5,143,556 issued on 1 Sep. 1992, for example.

Yet other known solar panel mounting systems ignore the problem of water, but provide channels in the structure to run electrical conduits. For example, Garvison et al. in U.S. Pat. No. 6,465,724 issued on 15 Oct. 2002 describes a multipurpose photovoltaic module framing system for direct mounting to a roof surface of a structure. The multi-purpose frame includes an integral electrical raceway to conceal and protect most electrical components and wires. Necessarily, the conduits for electrical raceways and for concealing electrical components are ill suited to direct or channel water. Another example includes the mounting system for a solar array described by Cinnamon et al. in U.S. Pat. No. 7,406,800 issued on 5 Aug. 2008.

Thus, there remains a need for an integrated photovoltaic mounting system, device and method of use that serves a dual purpose of a mounting structure for a solar electric system and also serves as a water shedding roof with a system designed to channel water to desired locations, such as an existing roof-gutter system provided by the structure. Moreover, such an improved system, device, and method of use should include structural elements that channel water in both a longitudinal (north-south) direction and a latitudinal east-west direction. Further, such a system should be economical to install and provide all amenities customarily provided by known mounting structures prevalent in this art.

SUMMARY OF THE INVENTION

The various preferred embodiments of the present invention provide a device, system and method for mounting solar panels in an array that overcomes the limitations of the current art. Specifically, the various preferred embodiments of the present invention provide an integrated photovoltaic mounting system, device, and method of use that serves a dual purpose of a mounting structure for a solar electric system and also serving as a water shedding roof with a system designed to channel water to desired locations, such as an existing roof-gutter system provided by the structure. Moreover, the present invention includes structural elements that channel water in both a longitudinal (north-south) direction and a latitudinal (east-west) direction. Further, the various preferred embodiments are economical to install and provide all amenities customarily provided by known mounting structures prevalent in this art.

In one preferred embodiment, the present invention comprises a building integrated photovoltaic (BIPV) mounting structure. It has a dual purpose in that it is a mounting structure for a solar electric system and it also serves as a water shedding roof. This system is comprised of both an east/west and a north/south gutter system. The east/west gutter system is strictly in place to catch any rainwater. The east/west metal pan gutter way is designed to attach to two perpendicular extruded aluminum channels. This east/west gutter way can be manufactured to any length to match the length of a specified solar module. The north/south gutter system not only receives all water from the east/west gutter but is also the main structural component of the design.

The structure is designed to allow for the mounting of most make, and model of framed solar modules to the north/south orientated extruded aluminum channels. Examples of existing solar module manufacturers that the present invention will accommodate include BP Solar, Canadian Solar, Evergreen Solar, Grape Solar, Mitsubishi Electric, Moser Baer, REC, Sanyo Solar, Schott, Schuco, Sharp, Solarworld, Suntech, and Sunpower. This list is in no way restrictive. Further, most solar modules may be mounted in landscape or portrait mounting options.

Each extruded channel will collect rainwater and channel it down into a regular rainwater runoff gutter system. The extruded channel is designed to except the keyed rail nut, which slides north/south along the channel. The keyed rail nut has a ¼-inch, 20 threads per inch tap, which accepts the ¼ inch by 20 thread-per-inch stainless-steel bolt. The ¼ inch stainless steel bolt serves as the attachment point for the stainless-steel top-down mounting clip. The mounting clip mechanically fastens a solar module to the extruded channel. The extruded channel and keyed rail nut are adjustable to accommodate any solar modules dimensions.

The extruded channel has a bolt slot on its underside. A ⅜-inch stainless steel bolt slides in the bolt slot and is the attachment point for the system to couple to a building or structure. The extruded channel can also attach with a beam clip, which attaches the channel to a structural support beam of the building or structure that the invention is mounted on. The ⅜" stainless steel bolt also serves as an attachment point for the bottom gutter support clip. The bottom gutter support clips may vary in size depending on the type of commercially available rain gutter being installed at the lowest point of the extruded channels.

There is also a side mounting bolt slot in the extruded channel for an east-west view-guard and a north-south view-guard, both of which attach to the body of the rail with a #12×24 hex head machine screw. The north-south view-guard has a north-south view-guard attachment clip that clips onto the north-south view-guard and bolts onto the rail body with the #12×24 hex head machine bolt. Either view-guard can be attached at any point along the north-south rail body.

The north-south rail body, extruded form a north-south channel, includes bolt slots on either longitudinal side so that a wire view-guard can selectively couple to either or both sides of the channel. The (extruded) bolt slot also is an attachment point for the east-west view-guard. The east-west view-guard has a bent tab on one end: This serves as a connection point to the side mounting bolt slot. The east-west view-guard also attaches to the rail body at its opposite end with a bent hook shape that fits the under turned edge of the top flange attaching it to the east or west top flange. The east-west view-guard is reversible and will attach to two perpendicular rail bodies when facing either way.

In another preferred embodiment of the invention uses a slotted top cap in place of the east-west water gutter secured from under the solar module's bottom frame edge with a stainless steel self threading screw that goes through a bottom plate, or a stainless steel fender washer, and threads into a slot in the slotted top cap. The slotted top cap has an attached gasket that serves to seal the east-west gap between the solar modules.

The various preferred embodiments of the present invention include terms of art of certain components as illustrated in the accompanying drawing figures. Such components include a rail body 112 comprising a first upright member 116 and a second upright member 118. The upright members are linked by an intermediate horizontal member 120 arranged about midway between the two terminal ends of each respective upright member. The first upright member terminates at one end with a first top flange 122. The second upright member terminate at one end with a second top flange 124. Each respective upright member further includes a side-mounting bolt slot 128

Each respective top flange includes a top surface 134 and the flange further includes an outward facing and downward-bending L-shaped feature terminating with an inward pointing inward Extending Finger 125.

The upper end of each respective upright member 116 and 118 cooperates with the intermediate horizontal member 120 to define a north-south water gutter channel 126. While the lower end of each respective upright member cooperates with the intermediate member and a bottom member 114 to form a generally rectangular hollow north-south structural rail channel 130.

The bottom member 114 further includes bottom flanges 131 with an upturned Edge 132.

Other components of the system include an east-west water gutter 135 having a lower drip flange 138 and gutter bottom wall 140 that connects between two oppositely facing upturned vertical sidewalls (e-w gutter first sidewall 141 and second 142).

Additional components of the system include an (aluminum) keyed rail nut 144 having two horizontally opposed ends, each end adapts to insert into a corresponding inner notch (west inner notch 146 and east inner notch 147) on the rail body 112. The rail nut includes an inner threaded hole adapted to receive a bolt 150. A top down mounting clip 149 arranges on the bolt adjacent to a top surface of the rail nut 144 and is held in place by a nut 151. Suitable fasteners include a ¼"×20 stainless-steel bolt for the top-down mounting clip 150, and a ¼"×20 stainless-steel nut for the top-down mounting clip 151, for example.

Alternatively, the keyed rail nut uses an inside mounting clip 156 instead of a top-down mounting clip, in certain installations.

The rail body 112 couples to an east-west view guard 170 by means of a fastener 158 including a #10×24 hex-head stainless-steel machine screw 158 cooperating with a #10×24 Stainless Steel Nut 159 at the top end of the vertical upright member 118, using a linking north-south view guard attachment clip 180. At the bottom of the rail body 112, the view guard 170 inserts in a respective slot.

The rail body couples to structural member provided at the installation site by means of an east bottom mounting bolt slot 160 and a west bottom mounting bolt slot 161 using a ⅜" stainless-steel bolt 162, for example, and a ⅜" Stainless Steel Flange Nut 163.

Other mounting or installations may require a galvanized steel beam clip 164 with a UHMW Isolator 165.

The system further contemplates a rain gutter support clip 166, a rain gutter attachment clip 167, and a #10×⅜" stainless-steel self-tapping screw 168 for various installations as depicted in the attached figures.

Additional components of the system include an east-west view guard 170 having an east-west view-guard mounting Flange 172 and hook flange 173. Another component is a north-south view-guard bracket 176 and a north-south view-guard mounting slot 178.

Additional components of the system further include an end plate 182, a slotted top Cap 184, a bottom plate 186 and a stainless-steel self-threading screw 188 for engaging a screw slot 189 in the top cap, a gasket 190 and a stainless-steel fender washer 192.

DRAWING

FIG. 8 is a partial view (left side) of an offset frontal exploded view of an assembly of various components of the system FIG. 5, the remainder (right-side) is shown in FIG. 9.

FIG. 9 is the completion of the view of FIG. 8 along the line 9-9 and shows an offset exploded view of the components of FIGS. 8 and 5.

FIG. 10 is a front view of a rail body of a second preferred embodiment of the present invention.

FIG. 11 is a front view of a second system incorporating the rail body of FIG. 10 and shows a middle array with a middle-mounting option in an exploded view.

FIG. 12 is another version of a first middle array-mounting option of a system of the present invention in relation to the rail body of FIG. 10.

FIG. 13 is front view of a second middle array-middle mounting option using the rail body of FIG. 10.

FIG. 14 is a front view of a first middle-array bottom and top mounting option using the rail body of FIG. 10.

FIG. 15 is a front view of a second middle-array bottom and top mounting option using the rail body of FIG. 10.

FIG. 16 is a front view of an east-west end of array with a first middle mounting option.

FIG. 17 is an exploded view of an east-west end of array.

FIG. 18 is a front view of an east-west end of array with a second middle mounting option.

FIG. 19 is an exploded view of an east-west end of array with a top and bottom first mounting option.

FIG. 20 is an assembled view of an east-west end of array with a second top and bottom second mounting option.

FIG. 21 is a side cutaway view of an east-west gutter according to the second preferred embodiment of the present invention.

FIG. 22 is a first side view of the second preferred embodiment of the present invention.

FIG. 23 is a second side view of the second preferred embodiment of the present invention.

FIG. 24 is an offset top view of the system according to the second preferred embodiment of the present invention.

FIG. 25 is an assembly view of the system of FIG. 24.

FIG. 26 is partial front view detailing a slotted top cap according to the second preferred embodiment of the present invention.

FIG. 26A is a front view of the slotted top cap of FIG. 26.

FIG. 27 is an offset top assembly view of the slotted top cap of FIG. 26.

FIG. 28 is an offset top assembly view of an alternative top cap.

DESCRIPTION OF THE INVENTION

Figure 1:
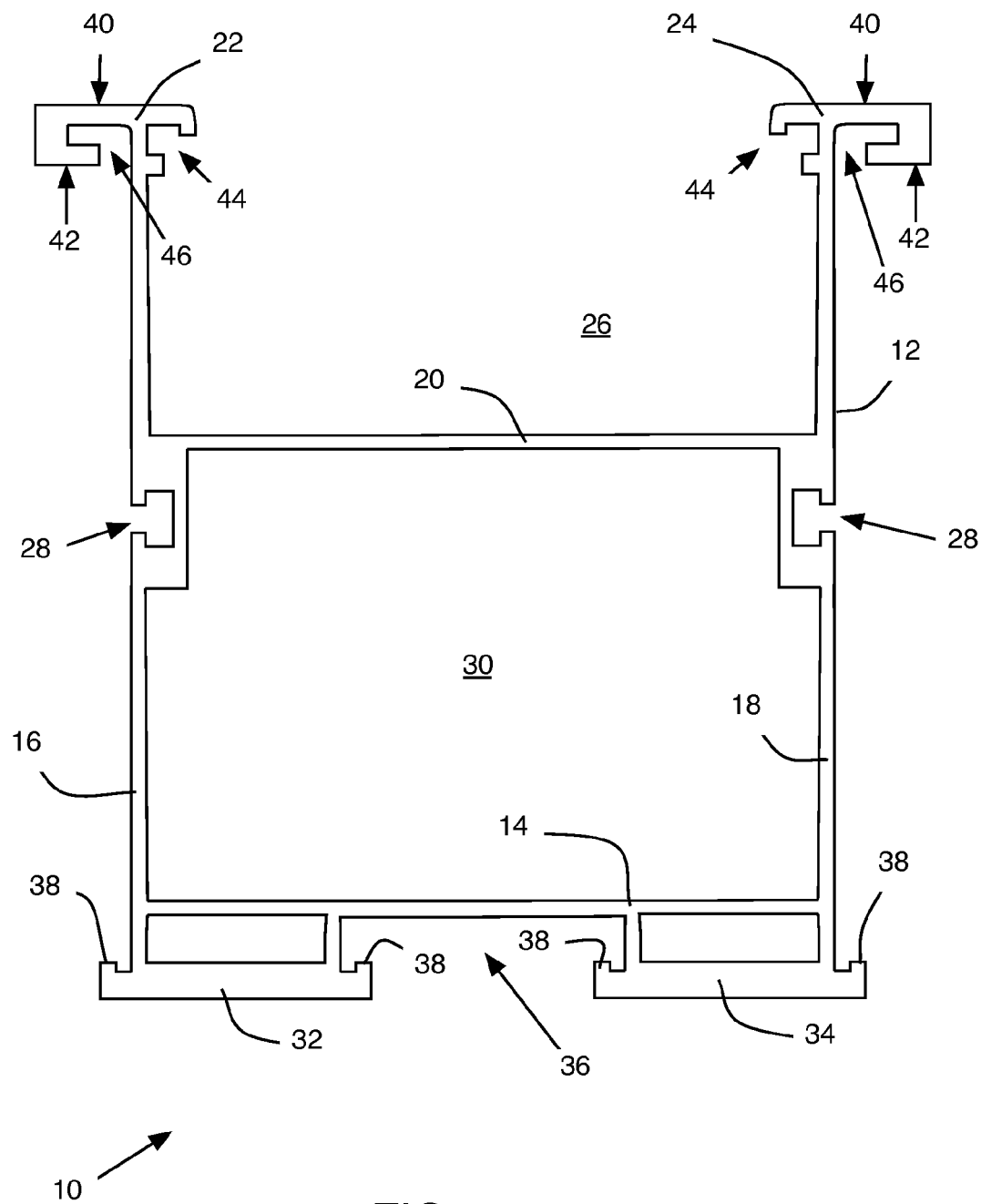
FIG. 1 is a front view of an n-s bracket according to a first preferred embodiment of the present invention.

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

With general reference to all the figures of the drawing, the various preferred embodiments of the present invention contemplate supporting, coupling, and otherwise interfacing with common solar modules. Commonly, almost all solar modules all have an aluminum frame all the way around the module. The glass and solar cells are actually only a ⅛" thick or so but the aluminum frame around it is usually a 1" deep or so all the way around (a module with aluminum frame is shaped exactly like a box lid that can slide down onto a box).

Accordingly, the present invention includes both north-south structural members and east-west weatherization members. As discussed and shown herein, the building-integrated photovoltaic (BIPV) support and weatherization system 21 according to a preferred embodiment of the present invention contemplates a rail body 12 to act as the north-south structural member and a east-west water gutter 70 as the east-west weatherization member, however, this arrangement is for the convenience of discussing the invention and should be understood that the rail body 12 arranges in a north-south orientation as used herein, but could be arranged in an east-west orientation and used as a water channel in the east-west direction; similarly, the east-west water gutter 70 could be used in a north-south orientation.

Further, the various components, and most notably the north-south rail body mounting bracket and channel (12) and the aluminum keyed rail nut (44) are constructed from aluminum from an extrusion process, the geometry, spaces, voids and such are described and shown as conventionally understood in extrusion forming. However, other materials, shapes, locations of voids, and structural members could work equally well.

In the various preferred embodiments, the aluminum frame common to all solar modules rests inside of the east-west water gutter 70, however the east-west water gutter 70 does not go up high enough to run into the module's combined approximately ⅛" thick backing, solar cell, and glass. Once the east-water gutter has been placed between two rail bodies 12, the solar module's aluminum frame edge actually rests in the channel of the east-west water gutter 70.

FIGS. 1-9 show a first preferred embodiment of the present invention. Specifically, with reference to FIGS. 1 and 2, the rail 12 comprises a generally u-shaped member that is symmetric about its vertical axis when viewed from the front and extends orthogonally from the sheet of FIG. 1 to any desired length based on the nature of the installation or the length of a standard solar module 11.

FIG. 1 illustrates a front view of an n-s structural member according to a first preferred embodiment of the present invention. The bracket 10 is generally symmetric left-to-right. That is, a vertical centerline would divide the left side into a mirror image of the right side of the bracket 10. Overall, the bracket forms a large U-shape with a horizontal bottom flange 14 having a first upright member 16 extending vertically from one end and a similar second upright member 18 extending vertically from the opposite end of the bottom flange 14. The bottom ends of the first and second upright members coincide with the first and second ends, respectively, of the bottom flange. Each vertical upright member forms generally a 90-degree right angle with the horizontal bottom flange.

Figure 2:
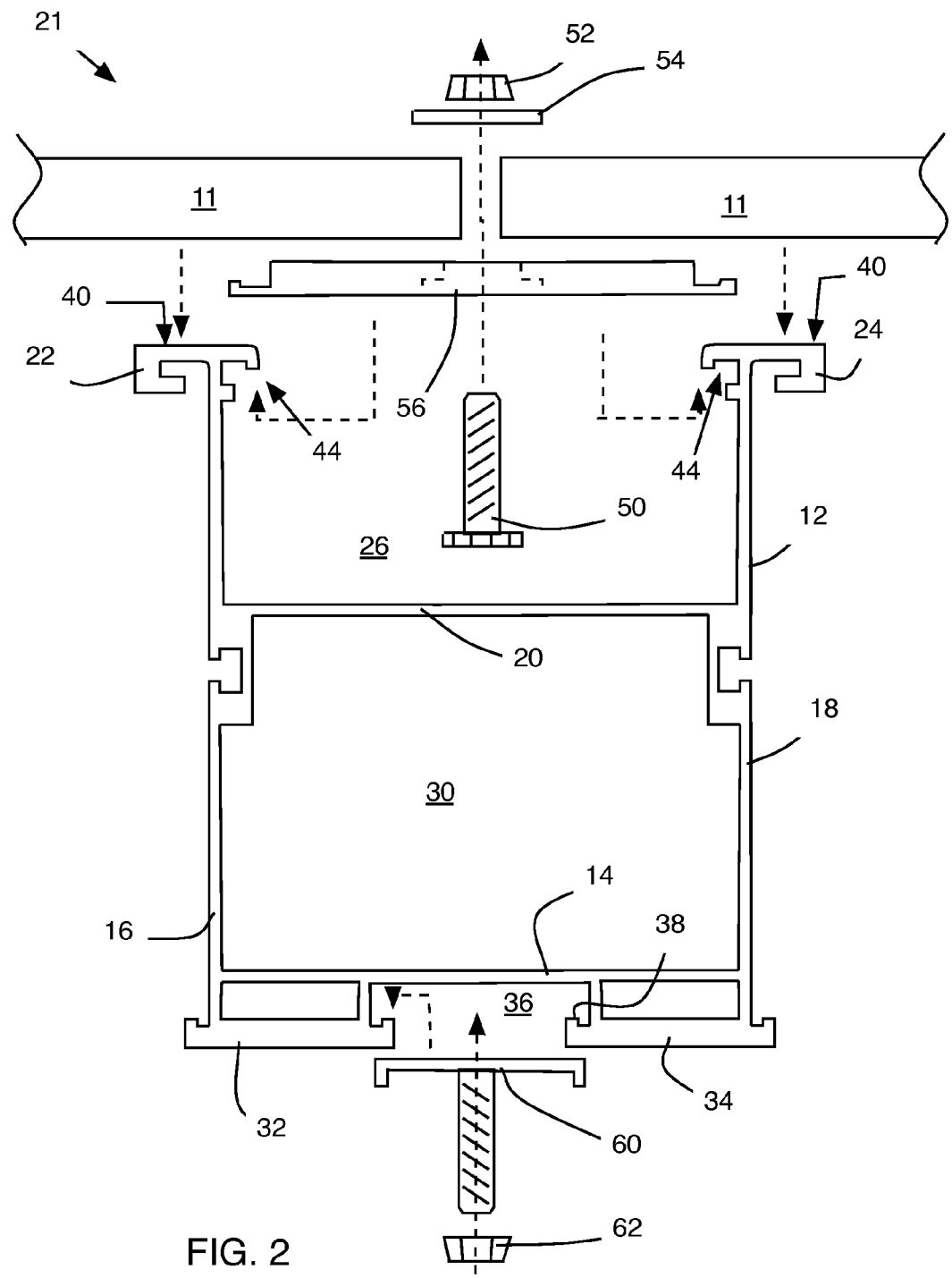
FIG. 2 is a front view of a preferred system incorporating the bracket of FIG. 1.

Extending downward from the horizontal bottom flange 14 is a pair of bottom rails. On the left side of the bottom flange, a first bottom rail 32 extends downward. As FIG. 2 shows, the first bottom rail comprises two short vertical leg members coupled to the bottom side of the bottom flange, and a horizontal member offset from the bottom flange but arranging generally parallel thereto. This horizontal member terminates with two, oppositely positioned upturned ends 38. Similarly, the right side of the bracket 12 includes a second bottom rail 38 of similar construction as the first rail 32. The two rails 32 and 34 cooperate to form a slot 36. This void is generally T-shaped and its use will be further discussed, below. While the slot 36 and upturned ends 38 have particular importance to couple to other components of this preferred embodiment, the specific configuration of rails 32 and 34 should not be deemed limiting.

Referring generally to the bracket 12 of FIG. 1 and more specifically to the system 21 shown in FIG. 2: Extending upwards from the bottom flange 14. The aforementioned first upright 16 and second upright 18 include a slot 28 intermediate to the proximal and distal ends. The proximal end of each vertical upright coincides with the two opposite ends of the bottom flange 14. Slightly above this slot 28, an intermediate horizontal member 20 links the first and second vertical upright members. A portion of the first upright 16, the horizontal member 20, and the second upright 18 form a u-shaped channel 26. This channel is watertight and functions to direct water in an n-s direction (controlled by the pitch of the roof of the structure, or other angled elevation).

The distal end of both the first and second vertical uprights (16 18) are similarly (mirrored) constructed and terminate in a flange (22 and 24, respectively) This flange includes a broad, horizontal top surface 40 adapted to enable the aluminum frame common to solar panel modules to rest thereon and a bottom surface 42. This top surface 40 is supported by a T-shaped horizontal arm, The T-shaped horizontal arm, disposed at a distal end of the associated upright member, further includes an inward extending shoulder terminating in downward pointing finger, the finger, inward extending shoulder and distal end of the associated upright member defining a first inward notch 44, and the T-shaped horizontal arm further having an outward extending shoulder having a downward extending arm and an inward extending finger, the downward extending arm, inward extending finger, outward extending shoulder, and distal end of the associated upright member defining a first outward L-shaped notch 46.

It will be further appreciated that the intermediate horizontal member 20, a lower portion of the first upright member 16, the bottom flange 14, and a lower portion of the second upright member 18 form a hollow void or define a frame channel 30. This provides structural rigidity and strength to the bracket 12 so that it may act as both a water-guiding conduit (u-shaped channel 26) and structural support for common solar modules.

The bracket 12 has a length (orthogonal to the view of FIG. 2) of any desired length depending on application, the size of the structure for mounting, the size of the solar panel, the run length, or other factors common in this art. The bracket 12 couples, or is other wise mounted to the structure, or roof or building by conventional means cooperating with a keyed rail bolt 60 which is sized to slideably insert in the channel of slot 36 formed between the two bottom rails 32 and 34. The bolt fastens to a nut 62, conventionally.

A conventional solar panel 11 attaches to the bracket 12 via mounting plate 56, which also selectively engages each respective inward notch 44 defined by the first and second upper flange (22 and 24). A bolt 50 passes through an appropriately sized clearance-fit through-hole on the plate 56 and passes between two (or adjacent to one) solar panel(s) 11. A retainer plate 54 fits over a portion of each solar panel and a nut 52 tightens to clamp the panel 11 and plate 56 relative to the bracket 12, which attaches to the structure by the keyed rail bolt 60.

Figure 3:
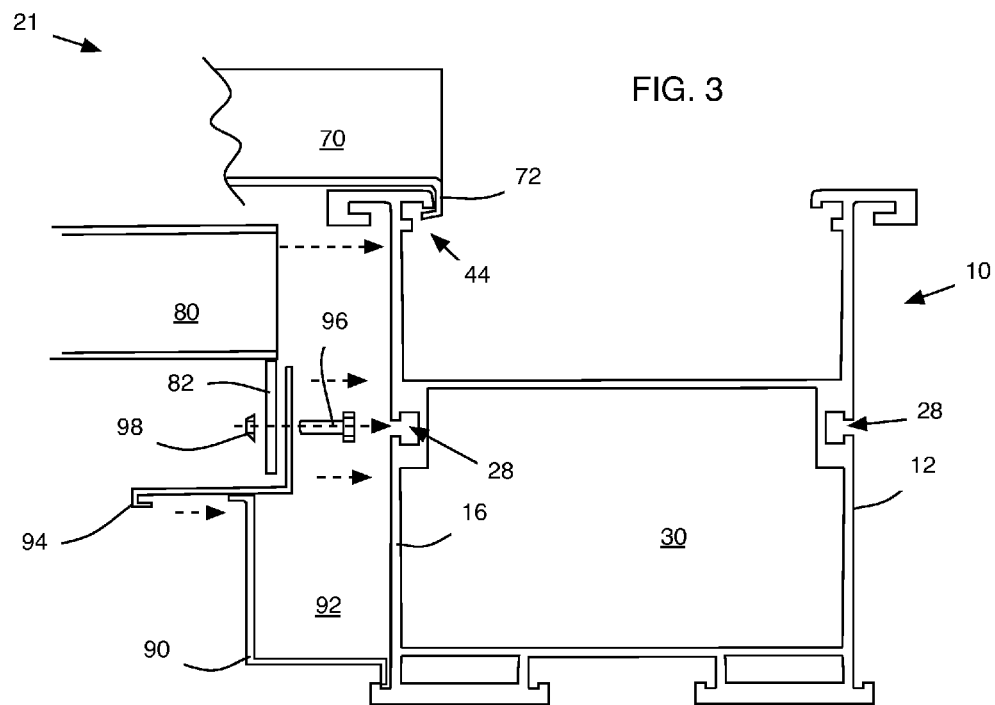
FIG. 3 is a front view of the system of FIG. 2 and shows an assembly of various components.
Figure 6:
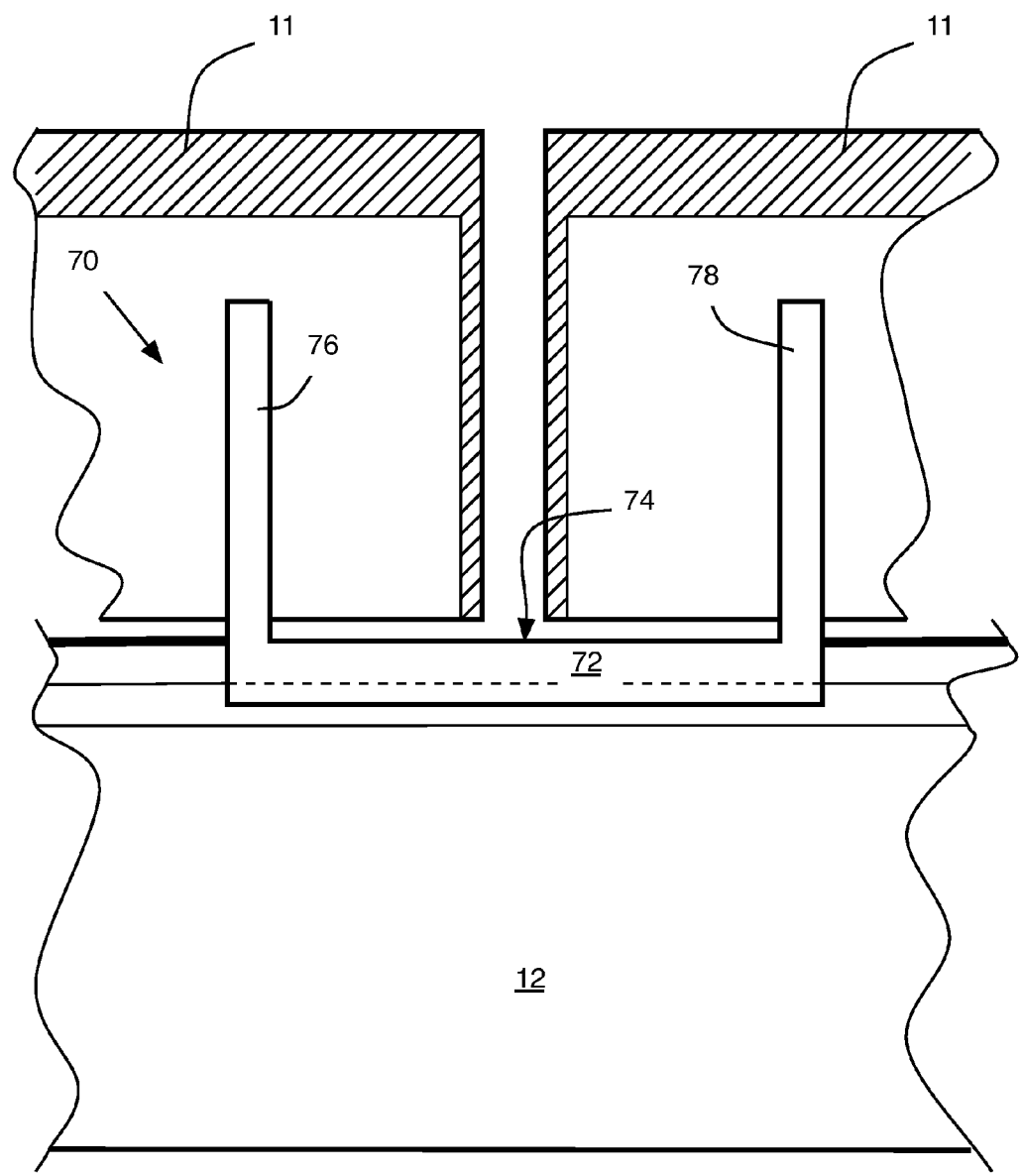
FIG. 6 is a right side sectional view along the line 6-6 of FIG. 4.

FIG. 3 shows the frame body 12 of the bracket 12 in relation to an e-w gutter 70, an e-w view-guard 80 and an n-s view-guard 90. The e-w gutter 70 arranges adjacent to the top flange of an associated vertical upright (the first upright as depicted in FIG. 3). The top surface 40 of the flange 22 supports a portion of the gutter 70 at a first end of the gutter (a second end of the gutter, not shown in FIG. 3, is supported by a second bracket 12 as would be appreciated by those of ordinary skill in this art). The east-west gutter 70 overlaps the inward shoulder portion of the top flange and the gutter presents a lower drip flange 72 extending over a portion of the top flange inward shoulder near the inward notch 44. As FIG. 6 shows, an end view, the e-w gutter 70 is of a general u-shaped configuration comprising a horizontal bottom wall 74 with an overextending drip flange 72. The bottom wall, at two opposite ends, turns upward to form two opposite facing, generally parallel and vertically extending sidewalls 76 and 78. Thus, water shedding from a solar module into the e-w gutter 70 flows through this u-shaped channel defined by the bottom wall 74 and two side walls 76 and 78 and is directed to either or both ends of the e-w gutter to the n-s bracket 12, at a lower elevation. The drip edge 72 prevents water wicking underneath and gravity pulls the water to the lower u-channel 26 of rail body 12.

An east-west (e-w) view-guard 80 abuts adjacent to the upright member 16 of the rail body 12. The e-w view-guard includes a downward extending mounting bracket 82, which is sized and positioned to present a though hole to align with the notch 28 in the rail body 12. A bolt slides into the rail body 12 at notch 28, extends through the flange 82 and affixes the e-w view-guard with a nut. The e-w view-guard is a hollow channel formed by a bottom wall, two vertical sidewalls and a horizontal top wall. The bottom wall and top wall are generally parallel to each other and run the length of the view-guard, which is sized to the installation application size as required. Similarly, the sidewalls are generally parallel to each other, run the same length, and are generally orthogonal to the bottom and top walls. Not shown in FIG. 3, the distal end of the gutter 70 is of similar construction and of the same elements as the proximal end shown by FIG. 3.

FIG. 3 also illustrates an n-s view-guard flange 90. The n-s view-guard flange 90 is generally of an L-shape having a horizontal leg and a vertical arm, the horizontal leg terminates in a downward facing foot, which is sized to fit in a groove formed by the upturned end 38 of the bottom rail 32. The vertical arm terminates in an outward bent hand. This hand engages a slot on a view-guard retainer 94. The view-guard retainer is of a general L-shape with a horizontal arm adapted to engage the hand of the view-guard flange 90 and further includes a vertical bracket with a though hole arranged to coincide with the notch 28 on bracket 12. Thus, the retainer 94 and flange 90 form a hollow channel 92 in which electrical conduits from the solar panel 11 can be positioned and protected from the elements.

Figure 4:
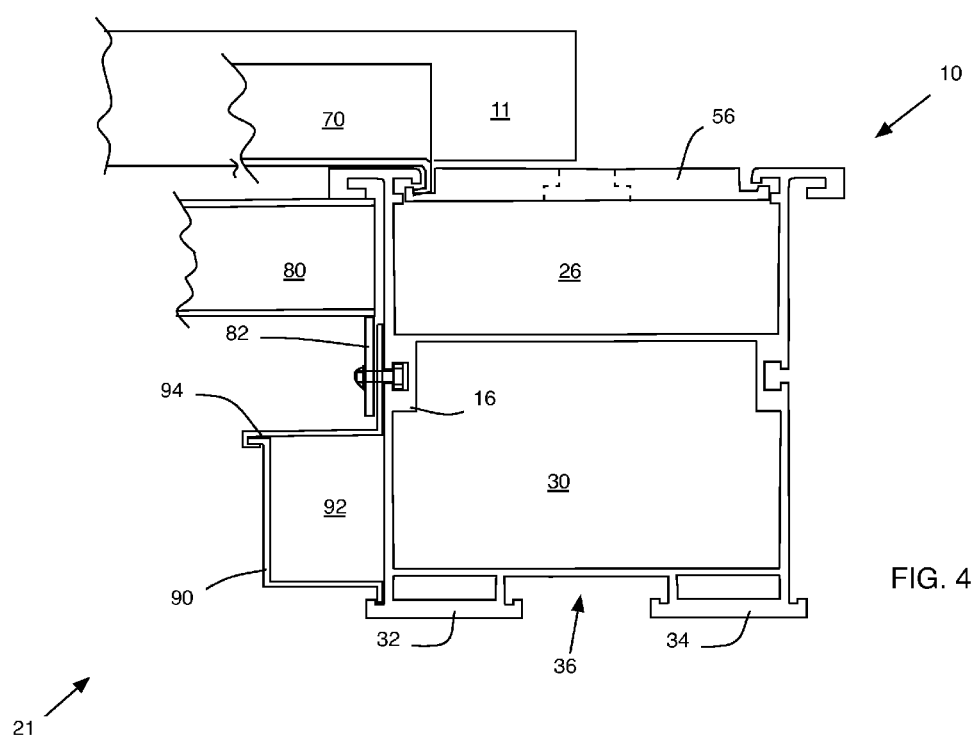
FIG. 4 is another front view of the system of FIG. 2 and shows additional components according to a preferred embodiment of the present invention.

FIG. 4 shows the system 21 of this first preferred embodiment of the present invention. FIG. 4 shows only one solar module 11, but it would be understood that each bracket supports a pair of modules 11.

Figure 5:
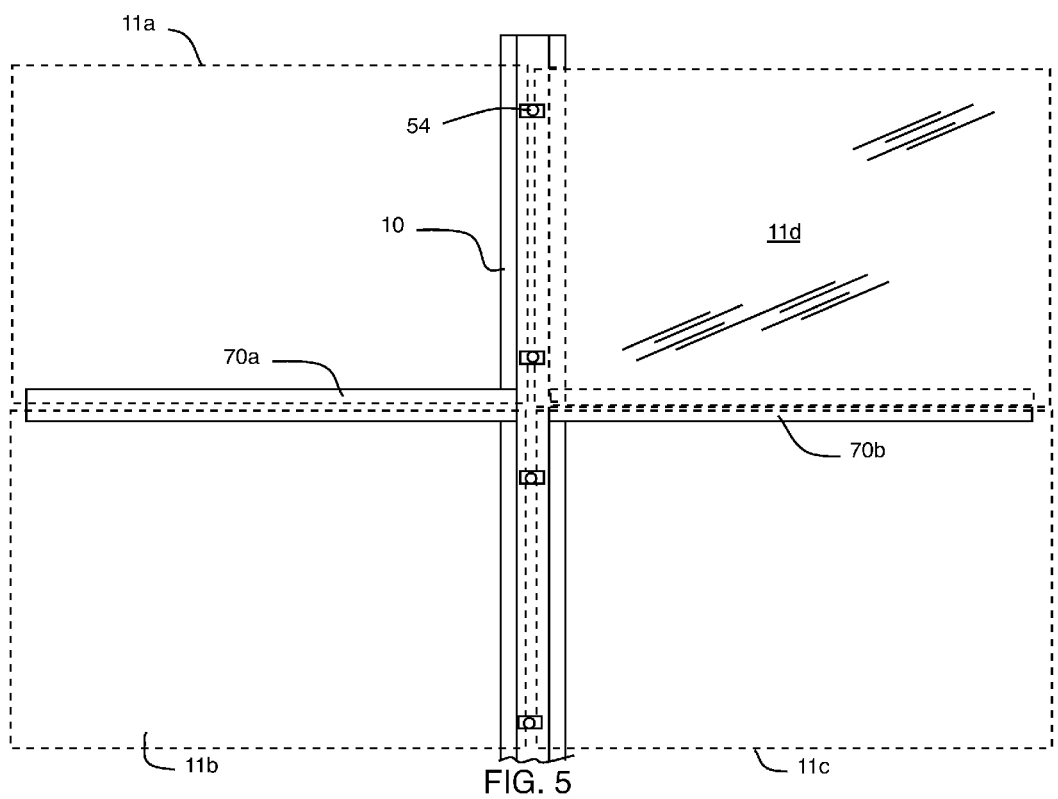
FIG. 5 is a top view of the first preferred system of the present invention.

FIGS. 5, 8 and 9 illustrate a representative solar array comprising four solar panel modules 11 (11a 11b 11c and 11d) arranged in a 2×2 matrix along with the first preferred system of the present invention. With specific reference to the top view shown by FIG. 5, the solar panels arrange in a 2×2 array with the solar panels generally represented by the reference numeral 11 and specifically as panels 11a, 11b, 11c, and 11d. The panels each completely overlap the e-w gutter 70, with panels 11a and 11b sharing a centrally located gutter 70a. It will be noted that the length of the gutter 70a is shorter than the overall panel width. Panels 11a and 11b share a common left side, n-s bracket 12a on the left side, and a common n-s bracket 12 on the right side. Bracket 12 is centrally located and supports the right edge of panels 11a and 11b and the left edge of panels 11c and 11d. There is a slight gap between panels 11a and 11b so that water may be shed into the gutter 70a and there is a gap between panels 11a and 11d so water may she into the n-s channel 26 of bracket 12.

As FIGS. 8 and 9 illustrate, this simple array of four panels would use four e-w gutters (70a, 70b, 70c, and 70d). One gutter adjacent to the lower edge of each solar panel 11 (11a, 11b, 11c, 11d, respectively) and three n-s brackets 12 (12, 12a, and 12b). Each n-s bracket couples to the structure using spaced-apart retainers 60 (of FIG. 2, for example). The spacing and quantity of such keyed rail bolts 60 would be determined on the structural and building code requirements of the particular installation as would be well-understood in the art.

Figure 7:
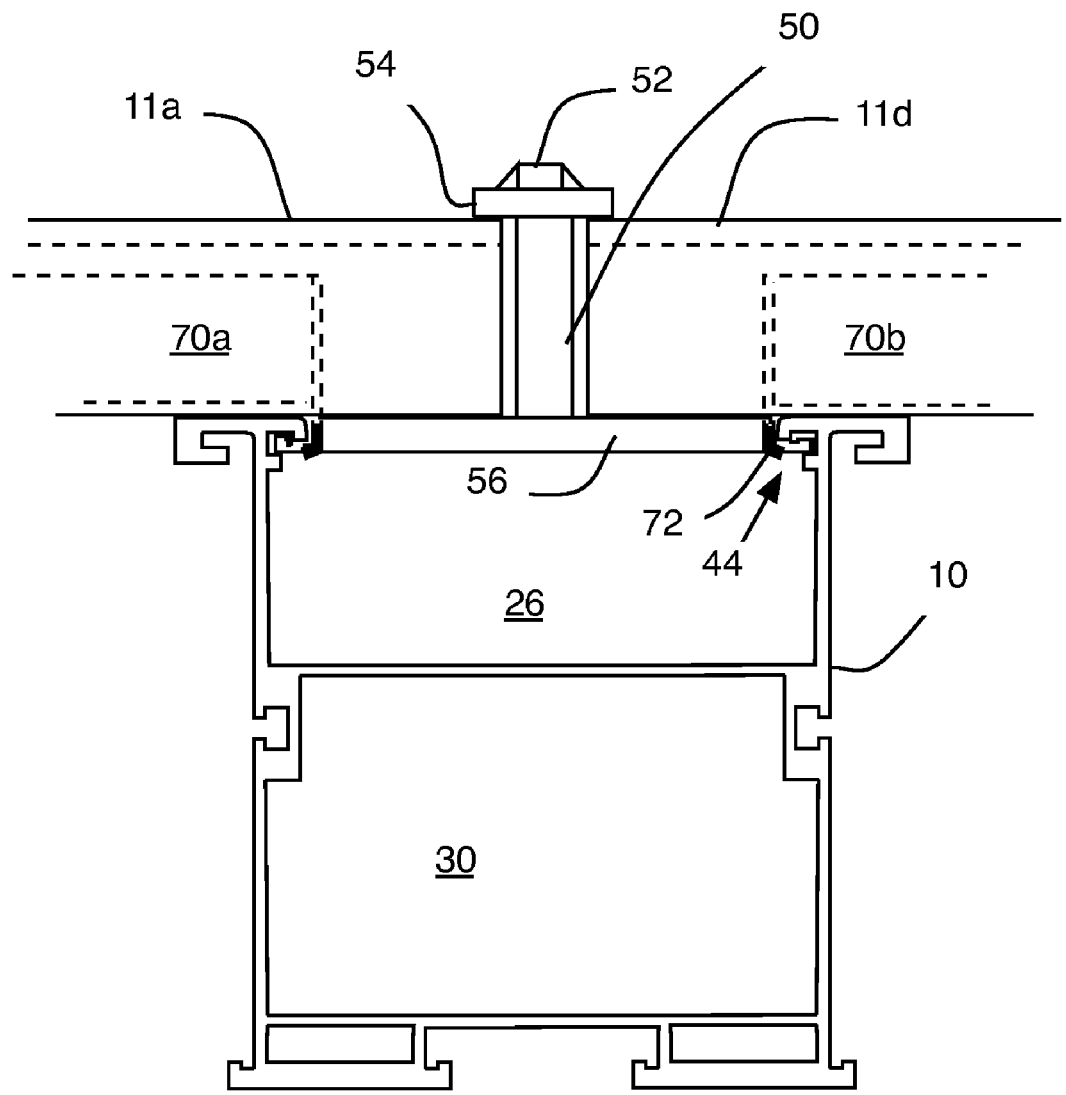
FIG. 7 is a front view of the system of FIG. 6.

FIG. 6 shows a right side view of the system 21 along the line 6-6 of FIG. 4. From this view it can be appreciated that the e-w gutter 70 includes a horizontal bottom wall 74 coupled to two vertically extending sidewalls 76 and 78 and that the overall height of the gutter 70 is less than the height of the solar panel module 11. The panel rests on the gutter. FIG. 7 shows a front view of this same system. With the panel resting on the e-w gutter 70, combined with the plate 56 fitting into the inward notch 44 and the panel and plate being retained by the bolt 50 and nut 52, the entire assembly is mechanically connected and locked to the bracket 12.

With reference to FIGS. 10-28, a second preferred embodiment of the present invention includes a support structure and water-channeling system 10 for supporting conventional solar modules 11. Similar to the first embodiment, only key distinctions of the second embodiment are discussed herein, those skilled in the art will appreciate that minor differences between the embodiments do not detract from the scope and spirit of the invention. And, where the first and second embodiments share the same or similar elements, a common reference numeral is used: However, it should be understood that substitution of elements between the first and second embodiments are contemplated and included in the scope and spirit of the present invention.

FIG. 10 illustrates a front view of a north-south structural member according to a first preferred embodiment of the present invention. The rail body 112 is generally symmetric left-to-right. That is, a vertical centerline would divide the left side into a mirror image of the right side of the rail body 112. Overall, the rail forms a large U-shape with a horizontal bottom flange (114) having a first upright member (116) extending vertically from one end and a similar second upright member (118) extending vertically from the opposite end of the horizontal bottom flange (114). The bottom ends of the first and second upright members coincide with the first and second ends, respectively, of the bottom flange. Each vertical upright member forms generally a 90-degree right angle.

An intermediate horizontal member 120 arranges between the first and second upright member (116 and 118) to form a hollow chamber termed a north-south structural rail channel 130, which provides structural rigidity to the rail body 112. The horizontal intermediate member 120 cooperates with the left and right vertical members 116 and 118 to form a U-shaped channel, or north-south water gutter channel 126. This channel diverts water shed from a solar panel (not shown in FIG. 10) along a north-south direction. A corresponding first top flange 122 and second top flange 124 arranges at the terminus of each respective upright member 116 and 118. Each flange includes extends horizontally away from the channel 126 and wraps around downward and ends in an inward facing finger 125. An externally positioned side mounting bolt slot 126 arranges near the top end of each upright 116 and 118, respectively. Further, an inward facing (east and west) inner notch 146 and 147 is also included near the top of each respective upright 116 and 118.

Making general reference to FIGS. 10-28, the horizontal bottom flange (114) has two bolt slots: an east bottom mounting bolt slot (160) and west bottom mounting bolt slot (161) that except a ⅜" stainless steel bolt (162) used for attaching the rail body 12 to the structure that the invention is mounted to, for example, a tubular steel purlin or other building structural member. The east bottom mounting bolt slot (160) and west bottom mounting bolt slot (161) form a junction between the first upright member (116) and the second upright member (118) and the horizontal bottom flange (114).

The horizontal bottom flange (114) terminates with two, oppositely positioned upturned ends, the north-south view-guard support flange (176). While the north-south view-guard mounting slot (178) and north-south view-guard support flange (176) have particular importance to couple to other components of this preferred embodiment, the specific configuration of the horizontal bottom flange (114) should not be construed as limiting.

Referring generally to the rail body 112 of FIG. 10 and more specifically to the system shown in FIGS. 10-28: Extending upwards from the horizontal bottom flange (114), the aforementioned first upright member (116) and second upright member (118) include a slot side mounting bolt slot (128) intermediate to the proximal and distal ends. The proximal end of each vertical upright coincides with the two opposite ends of the horizontal bottom flange (114). Optionally, an intermediate horizontal member (120) links the first and second vertical upright members. A portion of the first upright member (116), the intermediate horizontal member (120), and the second upright member (118), form a u-shaped channel (126). This channel is watertight and functions to direct water in a north-south direction (controlled by the pitch of the roof of the structure, or other angled elevation).

The distal end of both the first and second vertical uprights (116 and 118) are similarly (mirrored) constructed and terminate in a flange (122 and 124, respectively). This flange includes a broad, horizontal top surface (134) adapted to enable the aluminum frame common to solar panel modules to rest thereon. This top surface 136 is supported by a T-shaped horizontal arm. The T-shaped horizontal arm, disposed at a distal end of the associated upright member, further includes an inward extending shoulder terminating in downward pointing finger, the finger, inward extending shoulder and distal end of the associated upright member defining a first inward notch and the T-shaped horizontal arm further having an outward extending shoulder having a downward extending arm and an inward extending finger (125), the downward extending arm, inward extending finger, outward extending shoulder, and distal end of the associated upright member defining the west inner notch (146) and east inner notch (147).

It will be further appreciated that the intermediate horizontal member (120), a lower portion of the first upright member (116), the horizontal bottom flange (114), and a lower portion of the second upright member (118) form a hollow void or define a frame channel (130). This provides structural rigidity and strength to the rail body 112 so that it may act as both a water-guiding conduit (u-shaped channel 126) and structural support for common solar modules.

The rail body (112) has a length (orthogonal to the view of FIGS. 10-16, for example) of any desired length depending on application, the size of the structure for mounting, the size of the solar module, the run length, or other factors common in this art. The rail body 112 couples, or is otherwise mounted to the structure, or roof or building by conventional means cooperating with a ⅜ inch stainless steel bolt (162) which is sized to slideably insert in the channel of either the east bottom mounting bolt slot (160) and or the west bottom mounting bolt slot (161). The bolt fastens a steel beam clip (164), which wraps around the structural member that the system is mounted to with a UHMW isolator (165) between the steel components of the structure and the steel beam clip (164) and the aluminum components of the invention. The UHMW isolator (165) isolates the steel components and aluminum components to reduce galvanic corrosion between dissimilar metals of the BIPV support and weatherization system 21 and the metal components of the structure that the system mounts to. The beam clip (164) can mount in either an east-west axis or a north-south axis depending on which direction the structural members that the system is mounted to is orientated. This preferred embodiment of the invention in no way limits other mounting options such as directly bolting the rail body 12 to a structural member using longer bolts in the east bottom mounting bolt slot (160) and or the west bottom mounting bolt slot (161) through any material that is structurally sound for that purpose.

A conventional solar module (11) attaches to the rail body 12 via the aluminum keyed rail nut (144), which also selectively engages each respective west inner notch (146) and east inner notch (147) defined by the first and second upper flange (122 and 124). A bolt (150) passes through a threaded hole in the aluminum keyed rail nut (148) and passes between two (or adjacent to one) solar modules(s) (11). A top down mounting clip (149) fits over a portion of each solar panel and a nut (151) tightens to clamp the module (11) and top down mounting clip (149) relative to the rail body 112, which attaches to the structure by the stainless steel bolt in the east or west bottom mounting bolt slot.

FIGS. 12-14, for example show the rail body 112 of the BIPV support and weatherization system 10 in relation to an east-west water gutter 170, an east-west view-guard (136) and a north-south view-guard (174). The east-west water gutter 70 arranges adjacent to the top flange of an associated vertical upright. The top surface (134) of the flange (122) supports a portion of the gutter (136) at a first end of the gutter (a second end of the gutter, not shown in FIG. 3, is supported by a second rail body 112 as would be appreciated by those of ordinary skill in this art). The east-west water gutter 136 overlaps the inward shoulder portion of the top flange and the gutter presents an east-west water gutter lower drip flange (138) extending over a portion of the top flange inward shoulder near the east and west inner notches (146, 147). As the Figures show, the east-west water gutter 136 is of a general u-shaped configuration comprising a horizontal bottom wall 40 with an overextending east-west water gutter lower drip flange (138). The bottom wall, at two opposite ends, turns upward to form two opposite facing, generally parallel and vertically extending sidewalls 141 and 142. Thus, water shedding from a solar module into the east-west water gutter 170 flows through this u-shaped channel defined by the bottom wall 140 and two side walls 141 and 142, and is directed to either or both ends of the water gutter to the rail body 112, at a lower elevation. The east-west water gutter lower drip flange (138) prevents water wicking underneath and gravity pulls the water to the north-south water gutter channel (126) of the rail body 112.

FIG. 14, for example, also illustrates a north-south view-guard (174). The north-south view-guard flange (174) is generally of an L-shape having a horizontal leg and a vertical arm, the horizontal leg terminates in a downward facing foot, which is sized to fit in a groove formed by the upturned end (132) of the bottom flange (131). The vertical arm terminates in an outward bent hand. This hand engages a slot on a north-south view-guard attachment clip (180). The attachment clip is of a general L-shape with a horizontal arm adapted to engage the hand of the north-south view-guard (174) and further includes a vertical bracket with a though hole arranged to coincide with the side mounting bolt slot (128) on the rail body 112. Thus, the north-south view-guard attachment clip (180) and north-south view-guard flange (174) form a hollow channel in which electrical wiring from the solar modules (11) can be hidden from view.

The north-south view-guard's (174) function is to hide the wiring traveling in a north-south direction for aesthetic purposes. The north-south view-guard (174) includes a downward extending mounting support bracket (176), which is sized and positioned to align with a mounting slot (178) on the upturned flange (132) on the bottom of the rail body 112. A north-south view-guard attachment clip (180) clips on to the upper horizontal outward extending edge of the north-south view-guard and attaches at it's opposite side to the rail body 12 with a bolt which is sized to slideably mount into the side mounting bolt slot (128) through a hole in the upper flange of the clip.

The East-west view-guard (136) serves the same purpose as the North-south view-guard for hiding wiring running in an east-west direction. The East-west view-guard (136) abuts adjacent to the upright members 116 or 118 of the rail body 112. The east-west view-guard (136) is a hollow channel formed by a bottom wall, two vertical sidewalls and a horizontal top flange. The bottom wall and top wall are generally parallel to each other and run the length of the view-guard, which is sized to the installation application size as required. Similarly, the sidewalls are generally parallel to each other, run the same length, and are generally orthogonal to the bottom and top walls. One end of the east-west view-guard (136) clips on to the inward extending finger (125) of either the first top flange (122) or the second top flange (124) by hooking the east-west view-guard hook flange (173) into the inward extending finger (125). The other end attaches at to the rail body 112 with a bolt which is sized to slideably mount into the side mounting bolt slot (128) through a hole in the east-west view-guard mounting flange (172).

FIGS. 22-28 show alternative preferred methods of connecting the various components of the system of the present invention and mounting the system to a standard, commercially available water gutter to the bottom of each rail body 12 or rail body 112 using a rain gutter support clip (166) which attached to the rail body 12 with a bolt which is sized to slideably mount into the east or west bottom mounting bolt slot (160 and 161). The top outside edge of the water gutter is attached at the top of the rain gutter support clip (166) with the rain gutter attachment clip (167) which is also attached to the rail body 112 with the bolt (162). The rain gutter attachment clip (167) is then secured to the outside edge of the rain gutter support clip (166) and the commercial water gutter (as commonly understood in this art) with a self-drilling screw (168).

The materials contemplated for use in the various preferred embodiments of invention include, for example, for the rail body 12 or rail body 112 an extruded aluminum alloy 6005 T-5 or equivalent, anodized for protection from corrosion. And, the east-west water gutter 70 is formed from the appropriate gauge of aluminum sheet metal for the span that will be needed based on the solar module used, this is well-understood in the art. The keyed rail nut (144) is extruded from aluminum alloy 6005 T-5 or equivalent, and then anodized for protection from corrosion. The top-down mounting clip (149) is stamped from 12 gauge stainless steel sheet metal. The inside mounting clip (156) is extruded from aluminum alloy 6005 T-5 or equivalent. The steel beam clip (164) is cut and welded from structural steel and then hot dip galvanized for corrosion resistance. The UHMW isolator (165) is cut from ultra high-density polyethylene that has added ultra-violet protection for resistance to sunlight. The rain-gutter support clip (166) is cut from aluminum sheet metal of a sufficient gauge to resist bending for the size of the application. The rain gutter attachment clip (167) is cut from aluminum sheet metal of a sufficient gauge to resist bending for the size of the application. The east-west view-guard (136) is cut from aluminum sheet metal of a sufficient gauge to resist bending for the size of the application. The north-south view-guard (174) is cut from aluminum sheet metal of a sufficient gauge to resist bending for the size of the application. The north-south view-guard attachment clip (180) is cut from aluminum sheet metal of a sufficient gauge to resist bending for the size of the application. The end plate (82) is cut from aluminum sheet metal of a sufficient gauge to resist bending for the size of the application and of a gauge that can easily accept the self tapping screw (168). The slotted top cap (184) is extruded from structural aluminum with a proper alloy to accept an application of a gasket material, such as synthetic rubber, and is well-understood in the art with numerous conventional applications that would be well-suited to this application. Further, all hardware including fasteners, bolts, nuts, washers, and screws, for example, are commercially available and typically are formed from high-grade stainless steel, as would be understood by those skilled in this art.

FIG. 26 shows a partial front view of two abutting solar panels 11. The solar panels support a slotted top cap having a T-shaped body, which prevents water from leaking between the abutting panels, thereby channeling water over the solar panels to be collected by an intended collection device such as a gutter on the structure, the rail body 12 or 112 of the present invention or a gutter way 70 or 170 of the present invention. The slotted top cap adapted to arrange between abutting solar panels, the top cap arranging the T-portion of its body on top of the abutting solar panels and a gasket 190 arranged under the T-portion and above the panels 11, so to bridge any gap between the solar panels. The slotted top cap further cooperating with a bottom plate 186 to fix the T-shaped body in place relative to the abutting solar panels. And, the clip 184 further includes an internal hollow cylinder adapted to recieve a stainless-steel self-threading screw 188 for engaging a screw slot 189 in the top cap. A fender washer 192 inserts under the bottom plate near the panels.

Although the invention has been particularly shown and described with reference to certain embodiments, it will be understood by those skilled in the art that various changes in form and detail may be made without departing from the spirit and scope of the invention.

We claim:
1. A system comprising:
at least one rail body comprising a bottom flange, a first upright member extending from a first end of the bottom flange, a second upright member extending from a second end of the bottom flange, an intermediate horizontal member extending between and linking the first and second upright,
the at least one rail body further comprising a first bottom mounting rail extending downwards from the bottom flange, the first bottom mounting rail having two oppositely spaced upturned ends,
a second bottom mounting rail extending downwards from the bottom flange, the second bottom mounting rail having two oppositely spaced upturned ends,
a bottom rail receiving slot arranged intermediate to the first and second bottom mounting rails, and
the first and second upright members further including a vertical slot disposed at an intermediate position between the bottom flange and the corresponding first or second top flange;
a first top flange disposed on a top end of the first upright, and a second top flange disposed on a top end of the second upright whereby a portion of the first upright, the intermediate horizontal member, and the second upright form a u-shaped channel, and
wherein the intermediate horizontal member and the first upright member and second upright member cooperate to form an open-top, u-shaped channel having the intermediate horizontal member as a bottom surface for channeling a fluid, the bottom surface having a first length that is greater than a length of the first or second upright member determined from the intersection of the intermediate member to the respective first or second top flange;
and wherein the intermediate horizontal member, a lower portion of the first upright member, the bottom flange, and a lower portion of the second upright member define a frame channel, the frame channel having a generally rectilinear profile when viewed end-on wherein the intermediate horizontal member defines a top wall of the frame channel and a length of the top wall is about the same as a length of a side wall of the frame channel.
2. The rail body of claim 1 further comprising:
a north-south view-guard flange selectively coupled to the first upright member, the north-south view-guard flange further including a lower foot adapted to engage an outward upturned end of a first bottom mounting rail.

3. The system of claim 1 further comprising:
a keyed nut adapted to selectively engage the first top flange;
a clip adapted to contact a portion of a top surface of a solar module; and
a fastener selectively connecting the clip to the keyed nut whereby a portion of the solar panel overlaps the u-shaped channel.

4. The system of claim 1 wherein:
the rail body further comprises
a first bottom mounting slot arranged on a bottom face of the bottom flange;
a second bottom mounting slot arranged on a bottom face of the bottom flange, wherein at least the first bottom mounting slot cooperates with a fastener to couple the rail body to the structure.

5. The system of claim 1 further comprising:
at least one north-south view-guard flange selectively coupled to the first upright member, the north-south view-guard flange further including a lower foot adapted to engage an outward upturned end protruding from the first upright member.

6. The system of claim 5 further comprising:
at least one north-south view guard attachment clip adapted to couple to a mounting slot arranged on the first upright member using a fastener, the attachment clip having an inward turning flange adapted to couple to an outward turning upper end of the view guard.

7. The system of claim 1 further comprising:
a slotted top cap having a T-shaped body, the slotted top cap adapted to arrange between abutting solar panels, the top cap arranging the T-portion of its body on top of the abutting solar panels so to bridge any gap between the solar panels, the slotted top cap further cooperating with a bottom plate to fix the T-shaped body in place relative to the abutting solar panels.

8. A system comprising:
at least one rail body comprising a bottom flange, a first upright member extending from a first end of the bottom flange, a second upright member extending from a second end of the bottom flange, an intermediate horizontal member extending between and linking the first and second upright,
the at least one rail body further comprising a first bottom mounting rail extending downwards from the bottom flange, the first bottom mounting rail having two oppositely spaced upturned ends,
a second bottom mounting rail extending downwards from the bottom flange, the second bottom mounting rail having two oppositely spaced upturned ends
a bottom rail receiving slot arranged intermediate to the first and second bottom mounting rails, and
the first and second upright members further including a vertical slot disposed at an intermediate position between the bottom flange and the corresponding first or second top flange;
a first top flange disposed on a top end of the first upright, and a second top flange disposed on a top end of the second upright whereby a portion of the first upright, the intermediate horizontal member, and the second upright form a u-shaped channel, and
wherein the intermediate horizontal member and the first upright member and second upright member cooperate to form an open-top, u-shaped channel having the intermediate horizontal member as a bottom surface for channeling a fluid, the bottom surface having a first length that is greater than a length of the first or second upright member determined from the intersection of the intermediate member to the respective first or second top flange;
and wherein the intermediate horizontal member, a lower portion of the first upright member, the bottom flange, and a lower portion of the second upright member define a frame channel, the frame channel having a generally rectilinear profile when viewed end-on wherein the intermediate horizontal member defines a top wall of the frame channel and a length of the top wall is about the same as a length of a side wall of the frame channel;
And, the rail body wherein the first and second top flanges each, respectively, further comprise:
a T-shaped horizontal arm having a top surface, the T-shaped horizontal arm disposed at a distal end of the associated upright member and further having an inward extending shoulder terminating in downward pointing finger, the finger, inward extending shoulder and distal end of the associated upright member defining a first inward notch, and
the T-shaped horizontal arm further having an outward extending shoulder having a downward extending arm and an inward extending finger, the downward extending arm, inward extending finger, outward extending shoulder, and distal end of the associated upright member defining a first outward L-shaped notch.

9. The rail body of claim 8 further comprising:
a strut nut adapted to selectively engage each respective inward notch defined by the first and second upper flange.

10. The rail body of claim 8 further comprising:
an east-west gutter disposed on the first top flange, the east-west gutter further comprising a lower drip flange extending over a portion of the top flange inward shoulder.

11. A method for mounting solar modules to a structure, the method comprising:
providing a system as recited in claim 1;
arranging at least one rail body on the structure in a first orientation; and
coupling at least one solar module to the mounting rail.

12. The method of claim 11 further comprising:
arranging at least one rail body in a first orientation whereby water sheds from the solar panel into the u-shaped channel; and
coupling the rail body to an existing water shedding feature provided by the structure.

13. The method of claim 11 further comprising:
providing an east-west gutter;
arranging the east-west gutter in a second orientation generally perpendicular to the first orientation;
coupling the east-west gutter to the first top flange of the rail body whereby water shed from the solar module drains in the second orientation to the gutter and that water is channeled to the u-shaped channel.

* * * * *